(12) United States Patent
Frank et al.

(10) Patent No.: US 9,201,972 B2
(45) Date of Patent: Dec. 1, 2015

(54) SPATIAL INDEXING OF DOCUMENTS

(75) Inventors: John R. Frank, Cambridge, MA (US); Erik M. Rauch, Park Ridge, NJ (US); Ursula Rauch, legal representative, Little Egg Harbor, NJ (US); Manfred Rauch, legal representative, Little Egg Harbor, NJ (US)

(73) Assignee: Nokia Technologies Oy, Espoo (FI)

( * ) Notice: Subject to any disclaimer, the term of this patent is extended or adjusted under 35 U.S.C. 154(b) by 1334 days.

(21) Appl. No.: 11/929,738

(22) Filed: Oct. 30, 2007

(65) Prior Publication Data

US 2008/0228729 A1    Sep. 18, 2008

Related U.S. Application Data

(60) Continuation of application No. 11/147,033, filed on Jun. 7, 2005, now Pat. No. 7,953,732, which is a division of application No. 09/791,533, filed on Feb. 22, 2001, now Pat. No. 7,117,199.

(60) Provisional application No. 60/183,971, filed on Feb. 22, 2000, provisional application No. 60/201,839, filed on May 3, 2000.

(51) Int. Cl.
  *G06F 17/30* (2006.01)

(52) U.S. Cl.
  CPC ...... *G06F 17/3087* (2013.01); *G06F 17/30241* (2013.01); *G06F 17/30696* (2013.01); *G06F 17/30873* (2013.01); *Y10S 707/99932* (2013.01); *Y10S 707/99933* (2013.01); *Y10S 707/99937* (2013.01); *Y10S 707/99938* (2013.01); *Y10S 707/99939* (2013.01); *Y10S 707/99942* (2013.01); *Y10S 707/99943* (2013.01);

(Continued)

(58) Field of Classification Search
  CPC .......... G06F 11/3093; G06F 17/30061; G06F 17/3087; G06F 17/30696; G06F 17/30241; G06F 17/30873
  USPC .................. 707/724, 728, 729, 748, 999.007
  See application file for complete search history.

(56) References Cited

U.S. PATENT DOCUMENTS

| 5,032,989 A | 7/1991 | Tornetta |
| 5,164,899 A | 11/1992 | Sobotka et al. |

(Continued)

FOREIGN PATENT DOCUMENTS

| EP | 1 426 876 A | 6/2004 |
| GB | 2364225 | 1/2002 |

(Continued)

OTHER PUBLICATIONS

Matheson, et al., Geoparser Evaluation (geoXwalk Phase III WP 4), University of Edinburgh Data Library, Aug. 2004 (9 pages).

(Continued)

*Primary Examiner* — Mohammed R Uddin
(74) *Attorney, Agent, or Firm* — Alston & Bird LLP

(57) ABSTRACT

A computer-implemented method involving: gathering a set of files from one or more computers; analyzing the set of files to identify a plurality of files among the set of files that contain spatial information; storing information about the plurality of files, the stored information indicating that the identified files contain spatial information; and causing to be displayed to a user an indication that the identified files contain spatial information.

17 Claims, 7 Drawing Sheets

(52) U.S. Cl.
CPC ... *Y10S707/99944* (2013.01); *Y10S 707/99945* (2013.01); *Y10S 707/99948* (2013.01)

(56) References Cited

U.S. PATENT DOCUMENTS

| | | | |
|---|---|---|---|
| 5,327,792 A * | 7/1994 | Kanai | 73/865.5 |
| 5,623,541 A | 4/1997 | Boyle et al. | |
| 5,633,946 A * | 5/1997 | Lachinski et al. | 382/103 |
| 5,659,732 A | 8/1997 | Kirsch | |
| 5,659,742 A | 8/1997 | Beattie et al. | |
| 5,664,115 A | 9/1997 | Fraser | |
| 5,668,897 A | 9/1997 | Stolfo | |
| 5,717,914 A | 2/1998 | Husick et al. | |
| 5,761,538 A | 6/1998 | Hull et al. | |
| 5,778,362 A | 7/1998 | Deerwester et al. | |
| 5,784,540 A * | 7/1998 | Faltings | 706/46 |
| 5,802,361 A | 9/1998 | Wang et al. | |
| 5,808,615 A | 9/1998 | Hill et al. | |
| 5,839,088 A | 11/1998 | Hancock et al. | |
| 5,845,278 A | 12/1998 | Kirsch et al. | |
| 5,852,810 A | 12/1998 | Sotiroff et al. | |
| 5,856,060 A | 1/1999 | Kawamura et al. | |
| 5,870,559 A | 2/1999 | Leshem et al. | |
| 5,873,076 A | 2/1999 | Barr et al. | |
| 5,878,126 A | 3/1999 | Velamuri et al. | |
| 5,893,093 A | 4/1999 | Wills | |
| 5,920,856 A | 7/1999 | Syeda-Mahmood | |
| 5,930,474 A | 7/1999 | Dunworth et al. | |
| 5,958,008 A | 9/1999 | Pogrebisky et al. | |
| 5,960,447 A | 9/1999 | Holt et al. | |
| 5,961,572 A | 10/1999 | Craport et al. | |
| 5,963,956 A | 10/1999 | Smartt | |
| 5,978,747 A | 11/1999 | Craport et al. | |
| 5,978,804 A | 11/1999 | Dietzman | |
| 5,983,244 A | 11/1999 | Nation | |
| 5,991,754 A | 11/1999 | Raitto et al. | |
| 5,991,781 A | 11/1999 | Nielsen | |
| 5,999,664 A | 12/1999 | Mahoney et al. | |
| 6,018,733 A | 1/2000 | Kirsch et al. | |
| 6,035,297 A | 3/2000 | Van Huben et al. | |
| 6,038,561 A | 3/2000 | Snyder et al. | |
| 6,052,691 A | 4/2000 | Ardoin et al. | |
| 6,057,842 A | 5/2000 | Knowlton et al. | |
| 6,070,157 A * | 5/2000 | Jacobson et al. | 1/1 |
| 6,070,176 A | 5/2000 | Downs et al. | |
| 6,092,076 A | 7/2000 | McDonough et al. | |
| 6,133,913 A | 10/2000 | White et al. | |
| 6,144,962 A | 11/2000 | Weinberg et al. | |
| 6,145,000 A | 11/2000 | Stuckman et al. | |
| 6,148,260 A | 11/2000 | Musk et al. | |
| 6,148,289 A | 11/2000 | Virdy | |
| 6,151,624 A | 11/2000 | Teare et al. | |
| 6,182,068 B1 | 1/2001 | Culliss | |
| 6,184,823 B1 | 2/2001 | Smith et al. | |
| 6,202,065 B1 | 3/2001 | Wills | |
| 6,233,591 B1 | 5/2001 | Sherman et al. | |
| 6,233,618 B1 | 5/2001 | Shannon | |
| 6,236,768 B1 | 5/2001 | Rhodes et al. | |
| 6,237,006 B1 | 5/2001 | Weinberg et al. | |
| 6,240,410 B1 | 5/2001 | Wical | |
| 6,240,413 B1 | 5/2001 | Learmont | |
| 6,249,252 B1 | 6/2001 | Dupray | |
| 6,269,368 B1 | 7/2001 | Diamond | |
| 6,275,610 B1 * | 8/2001 | Hall et al. | 382/180 |
| 6,282,540 B1 | 8/2001 | Goldensher et al. | |
| 6,295,528 B1 | 9/2001 | Marcus et al. | |
| 6,297,824 B1 | 10/2001 | Hearst et al. | |
| 6,341,310 B1 | 1/2002 | Leshem et al. | |
| 6,343,139 B1 | 1/2002 | Finkelstein et al. | |
| 6,343,290 B1 * | 1/2002 | Cossins et al. | 1/1 |
| 6,366,851 B1 | 4/2002 | Chojnacki et al. | |
| 6,377,961 B1 | 4/2002 | Ryu et al. | |
| 6,381,605 B1 * | 4/2002 | Kothuri et al. | 1/1 |
| 6,397,228 B1 | 5/2002 | Lamburt et al. | |
| 6,411,293 B1 | 6/2002 | Sakamoto et al. | |
| 6,426,761 B1 | 7/2002 | Kanevsky et al. | |
| 6,470,287 B1 | 10/2002 | Smartt | |
| 6,470,383 B1 | 10/2002 | Leshem et al. | |
| 6,487,305 B2 | 11/2002 | Kambe et al. | |
| 6,493,711 B1 | 12/2002 | Jeffrey | |
| 6,542,813 B1 * | 4/2003 | Kovacs | 701/208 |
| 6,546,388 B1 | 4/2003 | Edlund et al. | |
| 6,556,990 B1 | 4/2003 | Lane | |
| 6,577,714 B1 * | 6/2003 | Darcie et al. | 379/93.17 |
| 6,584,459 B1 | 6/2003 | Chang et al. | |
| 6,629,065 B1 | 9/2003 | Gadh et al. | |
| 6,631,364 B1 | 10/2003 | Rioux et al. | |
| 6,638,314 B1 | 10/2003 | Meyerzon et al. | |
| 6,640,145 B2 | 10/2003 | Hoffberg et al. | |
| 6,684,369 B1 | 1/2004 | Bernardo et al. | |
| 6,701,307 B2 * | 3/2004 | Himmelstein et al. | 707/743 |
| 6,721,728 B2 | 4/2004 | McGreevy | |
| 6,731,314 B1 | 5/2004 | Cheng et al. | |
| 6,741,981 B2 | 5/2004 | McGreevy | |
| 6,799,176 B1 | 9/2004 | Page | |
| 6,823,333 B2 | 11/2004 | McGreevy | |
| 6,850,252 B1 | 2/2005 | Hoffberg | |
| 6,853,389 B1 | 2/2005 | Ikeda et al. | |
| 6,862,586 B1 | 3/2005 | Kreulen et al. | |
| 6,899,539 B1 | 5/2005 | Stallman et al. | |
| 6,910,003 B1 | 6/2005 | Arnold et al. | |
| 6,934,710 B1 | 8/2005 | Mills | |
| 7,007,228 B1 | 2/2006 | Carro et al. | |
| 7,013,428 B1 | 3/2006 | Kamen et al. | |
| 7,017,285 B2 | 3/2006 | Lakic | |
| 7,024,403 B2 | 4/2006 | Kyler | |
| 7,035,869 B2 | 4/2006 | Smartt | |
| 7,036,085 B2 | 4/2006 | Barros | |
| 7,065,532 B2 | 6/2006 | Elder et al. | |
| 7,107,285 B2 | 9/2006 | von Kaenel et al. | |
| 7,117,199 B2 | 10/2006 | Frank et al. | |
| 7,143,344 B2 | 11/2006 | Parker et al. | |
| 7,163,739 B2 | 1/2007 | Koike et al. | |
| 7,197,470 B1 | 3/2007 | Arnett et al. | |
| 7,233,942 B2 | 6/2007 | Nye et al. | |
| 7,274,332 B1 | 9/2007 | Dupray | |
| 7,310,633 B1 | 12/2007 | Wang et al. | |
| 7,325,201 B2 | 1/2008 | Ferrari et al. | |
| 7,353,113 B2 | 4/2008 | Sprague et al. | |
| 7,393,924 B2 | 7/2008 | Vitaliano et al. | |
| 7,411,204 B2 | 8/2008 | Appleby et al. | |
| 7,428,528 B1 | 9/2008 | Ferrari et al. | |
| 7,437,703 B2 | 10/2008 | Wu | |
| 7,473,843 B2 | 1/2009 | Wang et al. | |
| 7,483,025 B2 | 1/2009 | Roy et al. | |
| 7,539,693 B2 | 5/2009 | Frank et al. | |
| 2001/0011270 A1 * | 8/2001 | Himmelstein et al. | 707/3 |
| 2001/0011365 A1 | 8/2001 | Helfman | |
| 2001/0013035 A1 | 8/2001 | Cohen | |
| 2001/0040984 A1 | 11/2001 | Kambe et al. | |
| 2002/0000999 A1 | 1/2002 | McCarty et al. | |
| 2002/0016796 A1 | 2/2002 | Hurst et al. | |
| 2002/0042819 A1 | 4/2002 | Reichert et al. | |
| 2002/0047870 A1 | 4/2002 | Carro | |
| 2002/0076099 A1 | 6/2002 | Sakamoto et al. | |
| 2002/0078035 A1 | 6/2002 | Frank et al. | |
| 2002/0082901 A1 | 6/2002 | Dunning et al. | |
| 2002/0143900 A1 | 10/2002 | Kenner et al. | |
| 2002/0151992 A1 | 10/2002 | Hoffberg et al. | |
| 2002/0156779 A1 * | 10/2002 | Elliott et al. | 707/6 |
| 2002/0161736 A1 | 10/2002 | Beygelzimer et al. | |
| 2002/0188599 A1 | 12/2002 | McGreevy | |
| 2003/0004914 A1 | 1/2003 | McGreevy | |
| 2003/0005053 A1 | 1/2003 | Novaes | |
| 2003/0037048 A1 | 2/2003 | Kabra et al. | |
| 2003/0069873 A1 | 4/2003 | Fox et al. | |
| 2003/0078913 A1 | 4/2003 | McGreevy | |
| 2003/0097357 A1 | 5/2003 | Ferrari et al. | |
| 2003/0187867 A1 | 10/2003 | Smartt | |
| 2004/0010755 A1 | 1/2004 | Hamada | |
| 2004/0093328 A1 | 5/2004 | Damle | |
| 2004/0095376 A1 | 5/2004 | Graham et al. | |
| 2004/0117358 A1 | 6/2004 | von Kaenel et al. | |
| 2004/0119759 A1 | 6/2004 | Barros | |

(56) References Cited

U.S. PATENT DOCUMENTS

| | | | |
|---|---|---|---|
| 2004/0139400 A1 | 7/2004 | Allam et al. | |
| 2004/0199605 A1 | 10/2004 | LaCroix et al. | |
| 2004/0201500 A1 | 10/2004 | Miller et al. | |
| 2004/0210830 A1 | 10/2004 | Cote et al. | |
| 2004/0236730 A1 | 11/2004 | Frank | |
| 2005/0004910 A1 | 1/2005 | Trepess | |
| 2005/0008849 A1 | 1/2005 | Kagami et al. | |
| 2005/0091193 A1 | 4/2005 | Frank et al. | |
| 2005/0108213 A1 | 5/2005 | Riise et al. | |
| 2005/0108224 A1 | 5/2005 | Silverbrook et al. | |
| 2005/0119824 A1 | 6/2005 | Rasmussen et al. | |
| 2005/0193003 A1 | 9/2005 | Popovici | |
| 2005/0198008 A1 | 9/2005 | Adler | |
| 2005/0222879 A1 | 10/2005 | Dumas et al. | |
| 2005/0246310 A1 | 11/2005 | Chang et al. | |
| 2005/0270311 A1 | 12/2005 | Rasmussen et al. | |
| 2005/0278378 A1 | 12/2005 | Frank | |
| 2005/0278616 A1 | 12/2005 | Eller | |
| 2006/0004752 A1 | 1/2006 | Harel et al. | |
| 2006/0036588 A1 | 2/2006 | Frank et al. | |
| 2006/0041589 A1 | 2/2006 | Helfman et al. | |
| 2006/0101005 A1 | 5/2006 | Yang et al. | |
| 2006/0122794 A1 | 6/2006 | Sprague et al. | |
| 2006/0149774 A1 | 7/2006 | Egnor | |
| 2006/0155679 A1 | 7/2006 | Kothuri et al. | |
| 2006/0155999 A1 | 7/2006 | Holtzman et al. | |
| 2006/0159367 A1 | 7/2006 | Zeineh et al. | |
| 2006/0168233 A1 | 7/2006 | Alcorn et al. | |
| 2006/0174209 A1 | 8/2006 | Barros | |
| 2006/0184519 A1 | 8/2006 | Smartt | |
| 2006/0200259 A1 | 9/2006 | Hoffberg et al. | |
| 2006/0200260 A1 | 9/2006 | Hoffberg et al. | |
| 2006/0224587 A1 | 10/2006 | Zamir et al. | |
| 2006/0271281 A1 | 11/2006 | Ahn et al. | |
| 2007/0011150 A1 | 1/2007 | Frank | |
| 2007/0016562 A1 | 1/2007 | Cooper | |
| 2007/0016790 A1 | 1/2007 | Brundage et al. | |
| 2007/0078768 A1 | 4/2007 | Dawson | |
| 2007/0130112 A1 | 6/2007 | Lin | |
| 2007/0156677 A1 | 7/2007 | Szabo | |
| 2007/0179932 A1 | 8/2007 | Piaton | |
| 2007/0192300 A1 | 8/2007 | Reuther et al. | |
| 2007/0198495 A1 | 8/2007 | Buron et al. | |
| 2007/0233692 A1 | 10/2007 | Lisa et al. | |
| 2007/0239692 A1 | 10/2007 | McBride | |
| 2007/0288160 A1 | 12/2007 | Ebert | |
| 2007/0294233 A1 | 12/2007 | Sheu et al. | |
| 2007/0294284 A1* | 12/2007 | Evans | 707/102 |
| 2008/0010262 A1 | 1/2008 | Frank | |
| 2008/0033935 A1 | 2/2008 | Frank | |
| 2008/0033936 A1 | 2/2008 | Frank | |
| 2008/0033944 A1 | 2/2008 | Frank | |
| 2008/0040336 A1 | 2/2008 | Frank | |
| 2008/0052638 A1 | 2/2008 | Frank et al. | |
| 2008/0056538 A1 | 3/2008 | Frank | |
| 2008/0059452 A1 | 3/2008 | Frank | |
| 2008/0065685 A1 | 3/2008 | Frank | |
| 2008/0131003 A1 | 6/2008 | Bober | |
| 2009/0077461 A1 | 3/2009 | Silverbrook et al. | |
| 2009/0119255 A1 | 5/2009 | Frank et al. | |
| 2009/0183097 A1 | 7/2009 | Bayiates | |

FOREIGN PATENT DOCUMENTS

| | | |
|---|---|---|
| JP | 9-330329 A | 12/1997 |
| JP | 11-53366 A | 2/1999 |
| JP | 2000-11000 A | 1/2000 |
| WO | WO-2005/114484 | 12/2005 |
| WO | WO-2007/002800 | 1/2007 |

OTHER PUBLICATIONS

Japanese office action for corresponding JP application No. 2001-562372, dated Nov. 8, 2010, pp. 1-14.

Office action for related U.S. Appl. No. 11/929,710 dated Dec. 20, 2010, pp. 1-39.

Office action for related U.S. Appl. No. 11/929,721 dated Dec. 10, 2010, pp. 1-42.

European Office action for corresponding EP app. No. 01925106.5-2201 dated Aug. 9, 2007, pp. 1-5.

Intl Preliminary Report on Patentability for corresponding Intl app. No. PCT/US2007/003769 dated Aug. 12, 2008, pp. 1-7.

Intl preliminary report on patentablity for corresponding intl app. No. PCT/US2006/025296 dated Jan. 9, 2008, pp. 1-9.

Intl preliminary report on patentablity for corresponding intl app. No. PCT/US2007/013807 dated Dec. 16, 2008, pp. 1-10.

Intl preliminary report on patentablity for corresponding intl app. No. PCT/US2007/075289 dated Feb. 10, 2009, pp. 1-8.

Intl preliminary report on patentablity for corresponding intl app. No. PCT/US2007/075294 dated Feb. 10, 2009, pp. 1-6.

Intl preliminary report on patentablity for corresponding intl app. No. PCT/US2007/083238 dated May 5, 2009 pp. 1-7.

Office action for related U.S. Appl. No. 11/929,706 dated Aug. 31, 2010, pp. 1-44.

Office action for related U.S. Appl. No. 11/929,715 dated Oct. 22, 2010, pp. 1-18.

Office action for related U.S. Appl. No. 11/929,725 dated Aug. 24, 2010, pp. 1-9.

Office action for related U.S. Appl. No. 11/929,731 dated Aug. 31, 2010, pp. 1-40.

Supplementary European search report for corresponding EP app. No. 01925106.5-2201 dated Aug. 24, 2005, pp. 1-5.

Supplementary partial European search report for corresponding EP app. No. 01925106.5-2201 dated Jun. 3, 2005, pp. 1-4.

Internet Website: http://www.bbc.co.uk/h2g2/guide, The Hitchiker's Guide to the Galaxy, pp. 1-2, Feb. 1, 2001.

Internet Website: http://www.dogpile.com, homepage, pp. 1; Dogpile Local Search, pp. 1, Feb. 1, 2001.

Internet website: http://www.mapblast.com, home page, p. 1, Feb. 1, 2001.

Internet Website: http://www.mapplanet.com, home page, p. 1; Guided Tour—Introduction, p. 1; Guided Tour—Navigation, p. 1; Guided Tour—Claming a cell, p. 1; Guided Tour—Registration, p. 1; Guided Tour—Signing in, p. 1; Guided Tour—Searching, p. 1; Guided Tour—Technical Requirements, p. 1, Feb. 1, 2001.

Internet Website: http://www.northernlight.com, home page, pp. 1-2, 2000 Press Releases, Dec. 6; pp. 1-3, 2000 Press Releases, Jan. 19, pp. 1-3.

Internet Website: http://www.thunderstone.com/texis/site/demos/map, Web Indexing and Gis Example, pp. 1-2, Feb. 1, 2001.

Larson, et al., "The Sequoia 2000 Electronic Repository," Digital Technical Journal, vol. 7(3), pp. 50-65 (1995).

Mapquest, Internet Citation, 1999, XP02946890, http://www.mapquest.com.

Ooi, B.C., "Indexing in Spatial Databases", http://www.comp.nus.edu.sg/~ooibc/papers.html, A Spatial Indexing Structures (long survey) 1993, pp. 1-71.

Open GIS Consortium, Request for Quotation and Call for Participation in the OGC Geospatial Fusion Services Testbed Phase 1, Jun. 2000.

Sekine and Isahara, IREX Project Overview, Proceedings of LREC 2000: 2nd International Cofnerence on Language Resources & Evaluation, Athens (2000).

Sester et al., Linking Objects of Different Spatial Data Sets by Integration and Aggregation, GeoInformatica 2:4, pp. 335-358 (1998).

Smith et al., "Geographic Information Systems and Libraries: Patrons, Maps, and Spatial Information," Papers presented at the 1995 Clinic on Library Applications of Data Processing, pp. title, contents, 1, 80-121 (1995).

Smith, T., "A Digital Library for Geographically Referenced Materials" IEEE Computer (1996), vol. 29, pp. 54-60.

Su et al., Morphological Models for the Collapse of Area Features in Digital Map Generalization, GeoInformatica 2:4, pp. 359-382 (1998).

Vilain, et al., "Exploiting Semantic Extraction for Spatiotemporal Indexing in GeoNODE", Published Apr. 2000.

(56) References Cited

OTHER PUBLICATIONS

Ware and Jones, Conflict Reduction in Map Generalization Using Iterative Improvement, GeoInformatica 2:4, pp. 383-407 (1998).
Weibel and Jones, Computational Perspectives on Map Generalization, GeoInformatica 2:4, pp. 307-314 (1998).
Woodruff, et al., "GIPSY: Georeferenced Information Processing System", Computer Science Division University of California, Berkley and Library and Information Studies, University of California Berkley, pp. i-iii and 1-21 (1994).
Beard and Sharma, Multidimensional ranking for data in digital spatial libraries, Int. J. Digit. Libr. 1, pp. 153-160 (1997).
Christel, M.G. et al., "Interactive Maps for A Digital Video Library", IEEE Multimedia, IEEE Service Center, New York, vol. 7, No. 1, Jan. 2000, pp. 60-67.
Clifton, et al., "GeoNODE: An End-to-End System from Research Components", the 17th International Conference on Data Engineering, Heidelberg, Germany, Apr. 2-6, 2001.
Duhring, Geospatial Archive and Exploitation System, SGI White Paper, pp. 1-13 (Dec. 2001).
European Patent Office, Supplementary Partial European Search Report, for application No. EP 01925106.5-2001/US0140173, 2 pages, mailed Jun. 3, 2005.
Excerpts from Texis Tutorial, URL Http://www.thunderstone, com/ texis/site/demos/map/(1997).
Gaede, V., "Multidimensional Access Methods", ACM Computing Surveys, vol. 30, No. 2, Jun. 1998, pp. 170-231.
Guting R H: "An Introduction to Spatial Database Systems" VLDB Journal, Springer Verlag, Berlin, ET, vol. 3, No. 4, Oct. 1994, pp. 357-399.
Hill and Rasmussen, Geographic Indexing Terms as Spatial Indicators, in S. Stone & M.K. Buckland (Eds.), Studies in Multimedia: State-of-the-Art Solutions in Multimedia and Hypertext, Medford, NJ: Learned Information, pp. 9-20, 1992.
Hill, Spatial Access to, and display of, Global Change Data: Avenues for Libraries, Proceedings of the Data Processing Clinic Geographic Information Systems and Libraries: Patrons, Maps, and Spatial Information, pp. 125-150, 1995.
Hyland, et al., "GEONODE: Visualizing News in Geospatial Context", Federal Data Mining Symposium and Exposition '99, AFCEA, Mar. 9-10, 1999, Washington, D.C.
International Search Report for PCT/US07/003769, mailed Aug. 2, 2007, 4 pages.
Internet Website: "http://www.ismap.com", home page; locate addresses and local services in Europe, pp. 1-2, Feb. 1, 2001.
Internet Website: http://mapsonus.switchboard.com/bin/maps-route, Show Route, pp. 1-3, Show Map, pp. 1-2, Feb. 1, 2001.
Chen, et al., "The BioPortal Project: A National Center of Excellence for Infectious Disease Informatics", Proceedings of the 2006 International Conference on Digital Government Research, May 21-24, 2006, pp. 373-374.
International Search Report for International Patent Application No. PCT/US2007/013807 mailed Oct. 1, 2008, 8 pages.
International Search Report from PCT/US2007/075266 mailed Jan. 14, 2008, 13 pages.
International Search Report from PCT/US2007/075289, Mailed Feb. 12, 2008, 4 pages.
International Search Report from PCT/US2007/075294, Mailed Feb. 6, 2008, 4 pages.
International Search Report issued for PCT/US2007/083238, dated May 21, 2008, 15 pages.
International Search Report, PCT/US2006/025296, mailed Feb. 9, 2007, 6 pages.
Korn, "A Taxonomy of Browsing Methods: Approaches to the Lost in Concept Space Problem", University of Maryland, Department of Computer Science, 1996, 27 pages.
Liu, et al., "A New Point Process Transition Density Model for Space-Time Event Prediction", IEEE Transactions on Systems, Man, and Cybernetics: Part C: Applications and Reviews, 34(3):310-324 (2004).
Liu, et al., "Criminal Incident Prediction Using a Point-Pattern-Based Density Model", International Journal of Forecasting, 19(4):603-622 (2003).
Metacarta, "A White Paper on MetaCarta's Technology and Products", XP002463193, 2005, 24 pages.
Nadeau, et al., "Unsupervised Named-Entity Recognition: Generating Gazetteers and Resolving Ambiguity", Advances in Artificial Intelligence Lecture Notes in Computer Science; Lecture Notes in Artificial Intelligence; LNCS, Springer-Verlag, BE, 4013:266-277 (2006).
Petras, et al., "Time Period Directories: A Metadata Infrastructure for Placing Events in Temporal and Geographic Context", Proceedings of the 6th ACM.IEEE-CS Joint Conference on Digital Libraries, Jun. 2006, pp. 151-160, XP002478581.
Plazanet, et al., "Experiments with Learning Techniques for Patial Model Enrichment and Line Generalization,", Geoinformatica, 2(4):315-333 (1998).
Robertson, S.E. et al., "Simple, proven approaches to text retrieval", Technical Report, University of Cambridge, No. 356, May 1997, pp. 1-7.
Soffer, et al., "Integrating Symbolic Images into a Multimedia Database System using Classification and Abstraction Approaches", VLDB Journal, 7:253-274 (1998).
Zeng, et al., "West Nile Virus and Botulism Portal: A Case Study in Infectious Disease Informatics", Lecture Notes in Computer Science: Intelligence and Security Informatics [Online], vol. 3037/2004, Aug. 24, 2004, pp. 28-41.
Office action for related U.S. Appl. No. 11/929,731 dated Apr. 20, 2011, pp. 1-26.
Balacheff, et al., "A Trusted Process to Digitally Sign a Document," ACM, 2002, pp. 79-86.
Berners-Lee, "Semantic Web Road map," Google, 1998, pp. 1-10.
Henry, "Who's Got the Key?" ACM 1999, pp. 106-110.
Office action for related U.S. Appl. No. 11/929,721, dated May 27, 2011, pp. 1-42.
Canadian Office Action for related Canadian Patent Application No. 2,400,161, Jun. 13, 2011, pp. 1-3.
Office Action for related U.S. Appl. No. 11/929,721 dated Jan. 5, 2012, pp. 1-66.
Canadian Office Action for related Canadian Patent Application No. 2,400,161, dated Dec. 5, 2013, 2 pages.

\* cited by examiner

SPATIAL INDEXING OF DOCUMENTS

This application is a continuation of application Ser. No. 11/147,033, filed Jun. 7, 2005, which is a divisional of application Ser. No. 09/791,533, filed Feb. 22, 2001, which also claims the benefit of U.S. Provisional Application No. 60/183,971, entitled "Metacarta: Map-based Information Search Engine and Catalog," filed Feb. 22, 2000; and No. 60/201,839, entitled "Method and System for Associating Information with Physical Objects and Locations; and Methods of Expanding a Database," filed May 3, 2000, all of which are incorporated herein by reference.

TECHNICAL FIELD

This invention relates to computer systems, and more particularly to spatial databases, document databases, search engines, and data visualization.

BACKGROUND

There are many tools available for organizing and accessing documents through different interfaces that help users find information. Some of these tools allow users to search for documents matching specific criteria, such as containing specified keywords. Some of these tools present information about geographic regions or spatial domains, such as driving directions presented on a map.

These tools are available on private computer systems and are sometimes made available over public networks, such as the Internet. Users can use these tools to gather information.

SUMMARY OF THE INVENTION

In a computer system that presents a map interface to a user, the invention enables a user, among other things, to pose a query via the map interface and to be able to inspect a representation of the query results arranged on the map as icons. The map and the icons are responsive to further user actions, including changes to the scope of the map, changes to the terms of the query, or closer examination of a subset of the results.

The targets of the query are documents. Examples of documents include text-based computer files, as well as files that are partially text-based, files containing spatial information, and computer entities that can be accessed via a document-like interface. Documents can contain other documents and may have other interfaces besides their document-like interfaces. Every document has an address. In the case of world wide web documents, this address is commonly a URL.

The documents exist on computer systems arrayed across a computer network, such as a private network or the Internet. The documents may be hyperlinked, that is, may contain references (hyperlinks) to an address of another document. Copies of the documents may be stored in the page repository.

A spatial recognizer process examines documents for spatial information content. When the spatial recognizer determines that a document has spatial information content, the document is added to a spatial document collection.

A document ranking process assigns a spatial relevance score to each document in the spatial document collection. The spatial relevance score is a measure of the degree to which the document relates to the spatial location mentioned in its spatial information content. In cases where the document has more than one instance of spatial information content, the document is scored against each instance.

The spatial-keyword document indexer examines each document in the spatial document collection and represents it in an spatial-keyword document index data structure. The spatial-keyword document indexer indexes a document both by keywords and by at least one instance of spatial information content. The spatial-keyword document index enables unusually fast responses by the computer system to queries that combine spatial criteria with keyword criteria.

The crawler extends the collection of known documents by examining the hyperlinks contained in the known documents. When a hyperlink references a previously unknown document, the crawler adds the unknown document to the collection of known documents and examines them, in turn, for new hyperlinks to follow.

The crawler may prioritize the hyperlinks it follows based in part on spatial relevance scores.

The computer system includes a metasearcher process for initializing the collection of known documents. This initializing step is known as bootstrapping and is known in the art. The metasearcher queries predetermined search engines known to store information about other computer systems and document sources, such as search engine web sites on the Internet. The human administrators of the metasearcher provide it with a collection of known spatial locations. The metasearcher formulates queries based on these spatial locations and directs the queries to the search engines. After each query, the results are compared to the collection of known documents and are added if new.

However, it is common for search engines to cap the maximum number of results returnable to a single query. The metasearcher is able to respond to a results cap by issuing follow-on queries which are progressively more spatially focused. An example of a progressively more spatially focused series might be "New York state," "New York, N.Y.," "Times Square, New York, N.Y.," etc. By progressively narrowing the scope of its queries, the metasearcher reduces the number of results until the results number fits within the cap. The progressive spatial focus produces information more closely matched to a specific spatial location, as well as a more exhaustive sample of the results available from a given search engine. At the same time, the generality of early queries casts a net as broad as possible, so as not to miss any results. As a result, the documents found by the metasearcher form a diverse yet highly spatially-qualified sample for the crawler to start from.

In general, in one aspect, the invention is an interface program stored on a computer-readable medium for causing a computer system with a display device to perform a set of functions. The functions are accepting search criteria from a user including a free text entry query and a domain identifier identifying a domain; in response to accepting the search criteria from the user, retrieving a plurality of record identifiers each of which identifies a corresponding record which: (1) has associated therewith a location identifier that locates it at a specific location within the domain identified by the domain identifier; and (2) contains information that is responsive to the free text entry query; displaying a representation of the domain on the display device; and displaying on the display device a plurality of icons as representations of the records identified by the plurality of record identifiers. For each of the plurality of record identifiers, a corresponding one of the plurality of icons is displayed within the representation of the domain that is being displayed on the display device. The corresponding icon for each of the plurality of record identifiers is positioned within the representation of the domain at a coordinate within the domain that corresponds to the location identifier for the corresponding record.

Preferred embodiments include one or more of the following features. The domain is a geographical region and the representation is a multi-dimensional map of the geographical region. More specifically, the representation is a two-dimensional map of the geographical region. The step of accepting input further includes accepting a designation by the user of a designated category, wherein each of the records corresponding to the plurality of retrieved record identifiers also includes information that falls within the designated category. The step of accepting the designation by the user of a category includes presenting to the user a list of predefined categories and accepting as the designated category a selection by the user from that list. The interface program also is for causing the computer to perform the further functions of, after displaying the corresponding icon for each of the plurality of record identifiers, accepting further search criteria from the user. The further search criteria are selected from the group of search criteria types consisting of a domain identifier input type, a free text entry query input type, and a category type. It also causes the computer, in response to accepting the further search criteria from the user, to perform the functions of: (1) retrieving a subset of the plurality of record identifiers, wherein the subset of the plurality of record identifiers identifies all record identifiers among the plurality of record identifiers that fall within the further search criteria; (2) displaying a two-dimensional map of a revised geographical region on the display device that is responsive to the further search criteria; (3) for each of the record identifiers of the subset of plurality of record identifiers, displaying a corresponding icon within the displayed map, wherein the corresponding icon for each of the record identifiers of the subset of the plurality of record identifiers is positioned within the displayed map at a coordinate that corresponds to the location identifier for the corresponding record; and (4) storing as a filter the first-mentioned search criteria in combination with the further search criteria, wherein the stored filter is retrievable for use by the user in specifying a future search through the interface. The first-mentioned search criteria in combination with the further search criteria is an ordered sequence of inputs and the stored filter is the ordered sequence of inputs preserving the order of the sequence of inputs.

Preferred embodiments may also include one or more of the following features. The interface program also causes the computer to perform the further functions of: presenting to the user via the display device a map; and enabling the user to input the domain identifier as part of the search criteria by interacting with the displayed map. The plurality of icons include an icon of a first icon class and an icon of a second icon class; and the icon of the first icon class has first visual characteristics and the icon of the second icon class has second visual characteristics that are different from the visual characteristics associated with the first icon class. At least some of the records identified by the plurality of record identifiers are of a first type and at least some of the other records identified by the plurality of record identifiers are of a second type and the records of the first type are displayed using the icon of the first icon class and records of the second type are displayed using the icon of the second icon class. At least one of the icons of the plurality of icons represents multiple of the records identified by the plurality of record identifiers, wherein each of the multiple of the records having a location identifier that locates that record within a neighborhood about a central location.

Also in preferred embodiments, the interface program causes the computer to perform the further functions of: accepting a change of scale request from the user; in response to accepting the change of scale request, consolidating at least some of the plurality of icons with each other to form a second plurality of icons that is fewer in number than the number of icons in the first-mentioned plurality of icons; and in response to accepting the change of scale request, redisplaying the domain using a decreased scale and also using the second plurality of icons to identify the locations of the records identified by the plurality of record identifiers. In addition, it also causes the computer to perform the further functions of: accepting from the user a specification of an electronic note which has an associated location within the map; and displaying a sticky-note icon on the map at position that corresponds to the associated location. The electronic note comprises a web page with its own externally accessible address which enables people to electronically access its contents through that address.

In general, in another aspect, the invention is a method that performs the functions described above.

In general, in yet another aspect, the invention is a database system stored on a computer-readable medium for causing a computer system to perform the functions of: accepting search criteria including at least one of: (1) text; (2) a domain identifier identifying a domain; and (3) a filter identifier identifying a filter; and retrieving a plurality of record identifiers each of which identifies a corresponding record which has associated therewith the text, domain identifier, or layer identifier of the search criteria, where the retrieving is performed with a spatial-keyword document index.

In general, in still another aspect, the invention is a method of retrieving a plurality of record identifiers each of which identifies a corresponding record which has associated therewith at least one of a text, a domain identifier, and a layer identifier as specified by search criteria, wherein such retrieving is performed with a spatial-keyword document index.

Preferred embodiments include one or more of the following features. The spatial-keyword document index includes a spatial index tree extended to reference documents and a plurality of trees with the same structure as the spatial index tree but trimmed for particular lexicon entries and filters. The plurality of record identifiers are retrieved in a spatial-keyword document index tree and the branching structure of the tree is analyzed to identify geographic phenomena. A geographic phenomena is a spatial-keyword document index tree branching structure in which more than a predetermined fraction of the branches share more than predetermined number of parent nodes.

In general, in still yet another aspect, the invention is a program stored on a computer-readable medium for causing a computer system to perform the functions of: loading documents referred to by document addresses; parsing those documents for more document addresses to load; and parsing those documents for possible spatial identifiers.

Preferred embodiments may include one or more of the following features. The program also causes the computer system to perform the further function of analyzing the possible spatial identifiers to determine a location in a domain. A portion of the document addresses are gathered by a metasearcher process, which queries other computer systems using text that refers to spatial domains. The program also causes the computer system to perform the further function of computing a relevance score for each of the possible spatial identifiers found in each document. The relevance score includes one or more of: (1) the possible spatial identifier's position in the document; (2) the number of other possible spatial identifiers in the document; (3) whether the possible spatial identifier is in a sentence or is free standing; and (4) the formatted emphasis of the characters in the possible spatial identifier. The program also causes the computer system to perform the further function of sorting the document addresses by relevance score before loading.

In general in still another aspect, the invention is a program stored on a computer-readable medium for causing a computer system to perform the functions of: loading documents referred to by document addresses; parsing those documents for more document addresses to load; parsing those documents for possible spatial identifiers; and analyzing the possible spatial identifiers to determine a location in a domain.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
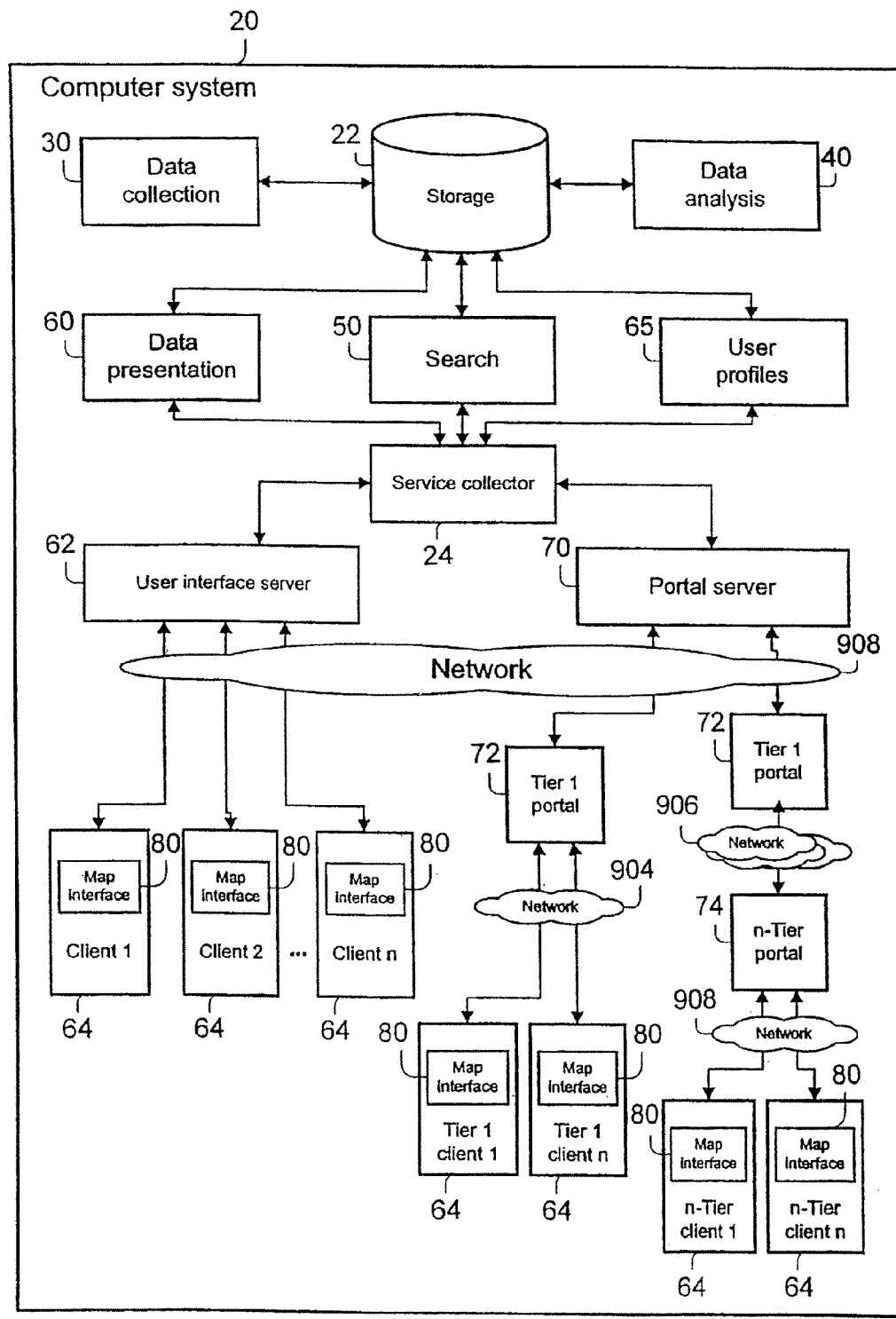
FIG. 1 schematically shows an overall arrangement of a computer system according to an embodiment of the invention.

In general, with reference to FIG. 1, the computer system 20 includes a storage 22 system which contains information in the form of documents, along with spatial information about the documents. The computer system 20 also includes subsystems for data collection 30, data analysis 40, search 50, data presentation 60, and portal services 70. The computer system 20 further includes a map interface 80 presented to a user through a variety of clients. Through the map interface 80, the user can query the storage 22 and can view a representation of the query results arranged on a map.

Documents

The targets of a user query are documents. Examples of documents include text-based computer files, as well as files that are partially text-based, non-text files, files containing spatial information, and computer entities that can be accessed via a document-like interface. Documents can contain other documents and may include other interfaces besides their document-like interfaces. Every document has an address. In the case of World Wide Web documents, this address is commonly a URL. As is the case with URL's, a portion of the address may include instructions or parameters that are passed to the computer server process that serves the document.

Figure 3:
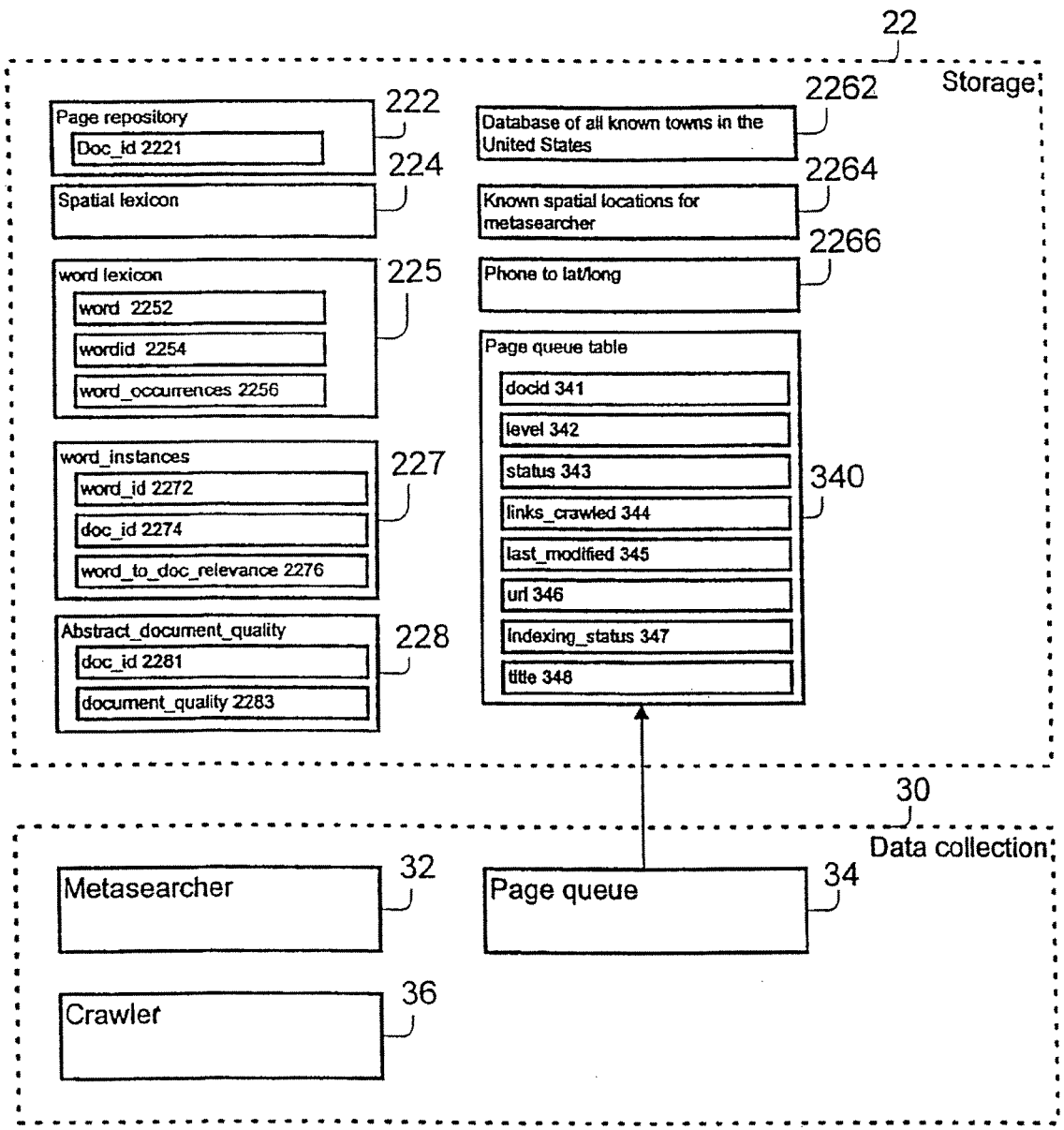
FIG. 3 is an explanatory diagram of storage entities and entities in a data collection process.

The documents exist on computer systems arrayed across a computer network, such as a private network or the Internet. The documents may be hyperlinked, that is, may contain an address of another document. Copies of the documents may be stored in the page repository 222 (FIG. 3).

General User Interface

Figure 2:
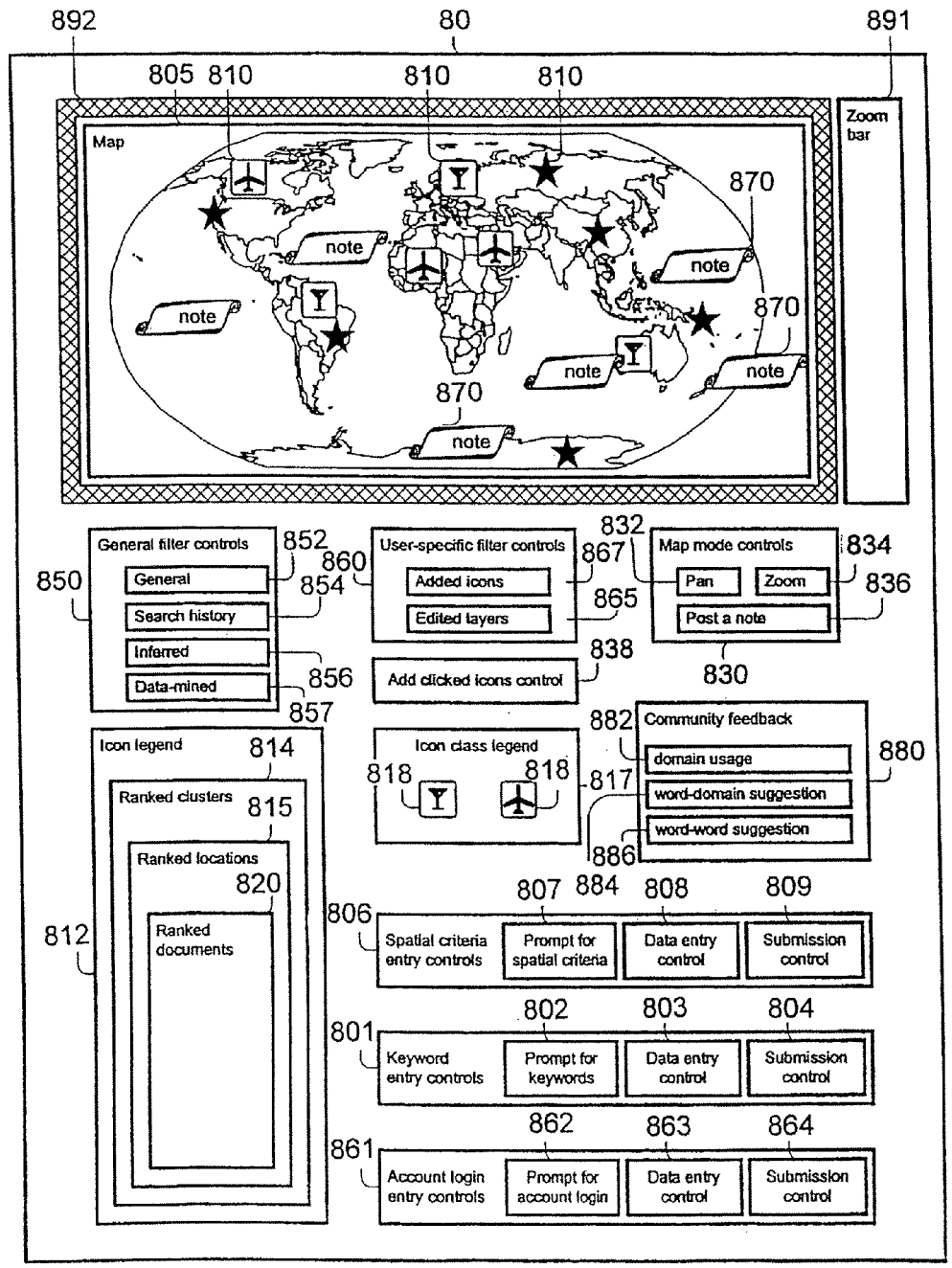
FIG. 2 schematically represents an arrangement of controls on a map interface according to an embodiment of the invention.

With reference to FIG. 2, the map interface 80 is presented to the user on a computing device having a user interface. The user interface may be graphical (GUI), voice-based, or text-only. Each feature of the GUI will be reproduced in a voice-based or text-only user interface, to the extent possible.

As is common in the art, the GUI includes a pointer symbol responsive to the user's manipulation of a pointing device such as a mouse, a touch-sensitive area, or a combination of directional buttons. The pointer symbol is superimposed on the GUI contents. The GUI is also responsive to a click event generated by the user. The click is usually associated with the user's manipulation of a button on or near the pointing device, but may be activated in other ways, depending on the computing device and its operating system. The client process receives click events and the position of the pointer symbol from the operating system of the computing device.

The map interface 80 includes a map 805. The map 805 is a representation, often in part, of at least one spatial domain. A spatial domain is any space with a location metric known to the spatial recognizer 48. In one embodiment, the surface of the Earth is a spatial domain under the 2-dimensional location metric of latitude and longitude—henceforth, the "standard geographic domain." In another embodiment, the "GPS domain" is defined by a volume around the surface of the Earth under the 3-dimensional metric of GPS (global positioning satellite) data.

A metric on a space need not identify spatial point locations. A document may be identified as being near a spatial point location. For example, a document could be identified as "near exit 19 off I-80 in Pennsylvania." A document could refer to an extended region like Plum Island state park.

The map 805 uses a scale in representing the domain. The scale indicates what subset of the domain will be displayed in the map 805. There is usually a range of scales appropriate to a given domain. By choosing a smaller scale, the user can examine a smaller portion of the entire domain in exchange for more detail per unit.

Several domains may exist along one spatial continuum. For instance, in one embodiment, the map 805 initially displays a representation of the whole surface of the Earth under the standard geographic domain. The map 805 might then be changed to display only one continent. This map 805 still displays a portion of the domain, but the scale has changed. However, the scale might change to the point that the map 805 displays only a close-up of a concert hall. At that point, the map interface 80 can change the domain to that of the concert hall, where locations can be expressed by section, row, and seat number, for instance. Domains can intersect or overlap, therefore, along a continuum of scale.

When the domain has geographic meaning, the map 805 may include standard geographic map features such as streets and waterways. Data for geographic features is available from the U.S. Census Bureau, the U.S. Geographic Survey, and companies such as GDT, of 11 Lafayette Street, Lebanon, N.H., or NavTech, of 10400 W. Higgins Road, Rosemont, Ill. The map can include spatial landmark features appropriate only to certain scales within the same domain, such as street names that do not appear until the scale is sufficient to allow individual streets to be represented.

The map 805 need not represent a domain that physically exists; the map 805 may represent something that is itself a representation, such as a virtual layout of a planned housing development. Still more abstractly, the map 805 may represent entities in a spatial layout where the spatial dimensions do not correspond to physical spatial dimensions. For instance, the domain may be a genealogical tree laid out on a plane, wherein one axis of the plane represents the linear progress of time.

A domain location is a location in the space that the map 805 represents. The domain location is usefully distinguished from the display location, which describes the placement of elements as displayed by the map 805. The measure of distance between domain locations depends on the domain, whereas the distance between display locations is measured in pixels of the computing device hosting the client 64.

A domain frame is the subset of the overall domain (possibly including the entire domain) displayed by a state of the map 805.

Changing the Map View

The user can adjust the view displayed by the map 805 in several ways.

The user can change the scale of the map 805 by a click on the zoom bar 891. The zoom bar 891 visually represents a plurality of scales that the map interface 80 is capable of displaying in the map 805. The scales displayed by the zoom bar 891 in any given state may be a subset of the total scales the map interface 80 is capable of displaying in the map 805. This subset may adapt to a change in state, including a change in scale. For instance, in a geographic context, the first state of the map interface 80 may display the entire globe in the map 805. In this first state, the zoom bar 891 may display scales ranging from global to street level, for instance. If the user narrows the scope of the displayed region to a street address corresponding to a concert hall, the zoom bar 891 might display scales ranging from seating sections to individual seats inside the hall.

The user can move the center of the map 805 by a click on the map border 892. The map border 892 surrounds the map 805.

By interacting with the map mode controls 830, the user can specify how the map interface 80 should respond to clicks on the map 805. The map mode controls 830 include controls for pan 832, zoom 834, and post a note 836. The pan 832 control and the zoom 834 control each have states including an "on" state and an "off" state. When the pan 832 control is in its "on" state, a click on the map 805 instructs the map interface 80 to re-center the map 805 around the location represented by the click. Likewise, when the zoom 834 control is in its "on" state, a click on the map 805 instructs the map interface 80 to zoom the map 805 in around the location represented by the click. The post a note 836 control is described in the section on electronic notes, below.

The map interface 80 includes spatial criteria entry controls 806. The spatial criteria entry controls 806 include a data entry control 808, a submission control 809, and a prompt for spatial criteria 807. The prompt for spatial criteria 807 instructs the user as to the purpose of the data entry control 808. The prompt for spatial criteria 807 may include a static instruction or may be dynamically responsive to user interaction, such as movement of the pointer symbol over the data entry control 808. The prompt for spatial criteria 807 may include sound. The user invokes the submission control 809 to notify the client process 64 that the data in the data entry control 808 is complete.

Examples of spatial criteria include geographic measurements such as latitude, longitude, or altitude; postal address information; or, returning to the concert hall example, row and seat number. Spatial criteria also include criteria that are indirectly spatial, i.e., criteria that do not describe spatial attributes but specify an entity which does have spatial attributes. An example of indirectly spatial criteria is the tracking number of a package. The tracking number might not be spatially descriptive in itself, but the package at any given instant might have a last known location that could be represented on the map 805.

The map interface 80 includes keyword entry controls 801. The keyword entry controls 801 include a data entry control 803, a submission control 804, and a prompt for keywords 802. The prompt for keywords 802 instructs the user as to the purpose of the data entry control 803. As with the prompt for spatial criteria 807, the prompt for keywords 802 may include a static instruction or may be dynamically responsive to user interaction, and may include sound. The role of the submission control 804 within the keyword entry controls 801 is identical to the role of the submission control 809 within the spatial criteria entry controls 806.

Note that part or all of the spatial criteria entry controls 806 and the keyword entry controls 801 may use the same interface components. For instance, if the user enters text "shoes near to Cambridge, Mass.," the system may consider this both spatial criteria and keyword criteria.

Examples of keywords include any word of interest to the user, or simply a string pattern. The computer system 20 compares the data in the data entry control 803 against the contents of the documents in storage 22. There are no predetermined restrictions on the keywords that may match a document.

The user may enter any text he/she desires in the text entry tools. The computer system 20 will parse entries to get possible domain changing commands and keyword queries. Keyword queries can be of any form. The computer system 20 does not restrict the entries to predefined categories. Instead, the computer system 20 attempts to match the query text against text found in all documents in the corpus.

One way to match the query text is to split it into separate strings divided by white space, where white space is commonly defined in the art as tabs, spaces, carriage returns, and other characters generally referred to by the regular expression character "\s". Each of these separate strings can then be searched for in the documents.

The text contents of the documents can be similarly divided into separate strings divided by white space. Thus, if the text entered by the user match any strings in the document corpus, the computer system 20 can retrieve results.

This "free text entry query" allows much more versatile searching than searching by predetermined categories.

Icons

The map interface 80 may include one or more icons 810 superimposed upon the map 805. Icons 810 need not be present in the map interface 80 when the client 64 is initially presented to the user. After the user has submitted a query, though, the map interface 80 may use icons 810 to represent documents in storage 22 that satisfy the query criteria to a degree determined by the search 50 process.

The display placement of an icon 810 represents a correlation between its documents and the corresponding domain location. Specifically, for a given icon 810 having a domain location, and for each document associated with the icon 810, the subsystem for data analysis 20 must have determined that the document relates to the domain location. The subsystem for data analysis 20 might determine such a relation from a user's inputting that location for the document. Note that a document can relate to more than one domain location, and thus would be represented by more than one icon 810.

An individual icon 810 belongs to an icon class. Icons 810 of the same icon class share visual characteristics that may include shape, color, size, indexing scheme (Roman numerals versus letters, e.g.), or animated behavior. An icon face 818 is an interface element of the map interface 80 satisfying the requirements of an icon class. In one embodiment, the client process 64 runs on a computer equipped with a monitor having a pixel size of approximately 0.28 mm, which is approximately the industry standard for desktop computers at the time the invention was made. For this pixel size, typical icons would be 15 to 20 pixels in diameter.

Note that there may be more than one way to satisfy the requirements of an icon class, so an icon class may have more than one icon face 818. For an example, see icon subclasses, below.

Visual similarities conferred by icon class may be used to represent topical similarities among the documents the icon 810 represents. For instance, documents affiliated with restaurant menus might be represented by icons 810 sharing a fork-and-knife shape. The fork-and-knife shape would be a property of the icon class.

Different colors, shapes, tints, and animated motions of the icons 810 might represent different features of the documents represented by the icons 810.

A class of icons may share the same geometric shape but have different colors, or different shades of the same color. The different shades might represent the several different properties of the documents represented by the icons. Different properties of the documents include the time elapsed since the document was created, the time elapsed since the document was introduced to the system, a relevance measure of the document, the size of the document.

Another feature of the icon class is the icon subclass. Two icon classes may be subclasses of a third class if they share the characteristics affiliated with the third class but vary at least one other characteristic in a consistent and meaningful way. For instance, the icon class for restaurants might have subclasses for quality, as measured by a certain newspaper's restaurant reviews. All icons 810 in the icon subclasses for restaurant quality would have a fork-and-knife shape in common, but icons 810 would be colored green for good reviews, red for poor reviews, or yellow for mixed-opinion reviews. They could even be divided in pie-chart fashion to show a percentage of each type of review. Thus, broad visual similarities can be used to imply broad topical similarities on one level, while visual sub-variation can be used to imply topical sub-variation on a second level. The icon legend 812 can inform the user of such conventions.

If icon class B is a subclass of icon class A, then icon class A is a parent class of icon class B.

Many domain locations have multiple documents referring to that location. To illustrate this to the user, the icon 810 used at that location in the map interface might be of a different size, color, or shape from other icons 810. For example, an icon 810 may be made to appear "stacked" as if a few of the icons 810 where placed nearly on top of each other. For another example, the icon 810 might appear to have parts of different icons 810 spliced together.

In a preferred embodiment, different colored icons 810 represent different layers of documents; varying shapes represent varying numbers of documents; varying shades represent varying relevance numbers for the underlying documents. The relevance of a set of documents referring to a given domain location might be computed by averaging or summing the relevance of the individual documents.

An icon 810 may represent one location in a domain or several neighboring locations. The number of locations depends upon several factors, including the scale of the map 805. When multiple icons 810 have display locations within a tolerance determined by the computer system 20, the map interface 80 consolidates icons 810 to increase visual clarity. Should the user change the scale of the map by zooming it, the map interface 80 recalculates whether to consolidate icons 810. The tolerance beyond which icon consolidation occurs may vary. The primary factor in the decision to consolidate is whether icons 810 are overlapping. For many icons 810, a good test of overlap is whether the display locations are closer than two times the average diameter of the icon faces 818. Other factors in the decision to consolidate include visual characteristics of the icon faces 818, visual characteristics of the map 805, characteristics of the domain, characteristics of the documents, and the number and variety of icons currently present in the display.

A consolidated icon 810 may represent multiple spatial domains. For instance, consider the standard geographic domain that includes Washington, D.C., and another domain for Ford's Theater under the concert-hall seating metric. At certain display scales, documents that represent the Lincoln Memorial might be consolidated into the same icon as documents describing the specific seat in Ford's Theater in which Lincoln was shot. In this example, the Lincoln Memorial document might be affiliated with the standard geographic domain. The Ford's Theater document might be affiliated with a domain specific to Ford's Theater, but in this example is may be displayed on the standard geographic because the entire Ford's Theater domain can be mapped onto a fairly small region, relative to the size of the domain requested by the user.

An icon 810 may also represent multiple topical categories among its documents, regardless of whether the icon 810 is consolidated. In this case, the icon face 818 may be altered to reflect the multiplicity of topics.

The icon legend 812 is another element of the map interface 80. The icon legend 812 relates an icon 810 to the documents it represents. The icon legend 812 comprises a listing of documents. The listing may be grouped or ordered in a variety of ways.

Icons 810 are listed in the icon legend 812 according to an order compiled by the search 50 process.

A non-consolidated icon 810 represents a single display location. The order of its documents as listed in the icon legend 812 is based on a relevance ranking compiled by the search 50 process. The relevance ranking scores each document against the user's query criteria.

A consolidated icon 810 may represent a plurality of domain locations. A consolidated icon 810 may represent a plurality of icon classes. The different icon classes may entail different topical categories. The icon legend 812 may differentiate the document listings according to these topical categories: for instance, by grouping them by category; by adding a field to each entry in the list, specifying the category; or by adding a visual emphasis. The visual emphasis may include a change in typeface, a change in color, or the presence of an icon type affiliated with the category. Several effects can be combined, such as grouping by category in combination with a variation in background color between adjacent groups.

Filters

The map interface 80 includes two groups of controls for managing filters, a general filter display 850 and a user-specific filter display 860.

With reference to FIG. 3, a filter selects a subset of the corpus of documents in the page repository 222. Filters are defined recursively: a filter is a list of elements, where each element can be either a keyword string, a set of spatial criteria, a human-compiled list of documents, a domain frame, or another filter. The elements may be defined in a sequence allowing the user to select a collection of documents. The sequence of filters may be combined with the Boolean AND operator to produce an intersected document set that is the same for any order of the filters. Two sets of filters may be combined with the Boolean OR operator. When viewing a set of documents in a map 805, the user may change the map view to display a subset of this document set, which may be different than if the user performed the filtering operation after changing the map view. Thus, every user query defines a filter, because it contains either keywords, spatial criteria, a change to the domain frame, or several in combination. The initial state of the map interface 80—even if the user has not yet interacted with it—defines a filter, since the map 805 has at least a domain frame associated with it. Similarly, because a non-empty map 805 defines a filter, zooming or panning the map 805 always defines a new filter based on the previous filter plus the new domain frame. Each group of icons 810 defines its own unique filter: namely, the filter defined by the current state of the map 805, but with the resulting documents restricted to those associated with at least one of the icons 810 in the group. In this way, a click on an icon 810 can define a filter, since a single icon 810 is simply a group of one.

The general filter display 850 includes filters created for the user. The user-specific filter display 860 includes filters created by the user. The two sets of controls, 850 and 860, can be disjoint or can share controls in the map interface 80.

The general filter display 850 includes general 852 filters, search history 854 filters, and inferred 856 filters. A general 852 filter is a filter predefined by the computing system 20. This includes filters handpicked by human editors to be of general interest to the user population, as well as filters selected algorithmically for having a high frequency of recurrence among the usage patterns of the user population. A search history 854 filter is a filter the current user has applied in the current or previous session possibly without explicitly instructing the system to remember it. By providing easy access to search history 854 filters, the system allows the user to reapply a filter that he/she created earlier but neglected to add to the user-specific filter display 860.

An inferred 856 filter is a filter selected algorithmically based on the usage patterns of the current user.

A data-mined 857 filter is a filter created algorithmically by a procedure that analyzes the content and hyperlinks of documents in the page repository 222 to create a set of documents sharing a property. The property may be determined heuristically, e.g. "all documents appearing to relate to cooking recipes." The algorithm to construct such a filter might include the use of Bayesian learning, statistical analysis, and ontologies of words and phrases.

The user-specific filter display 860 is not shown by certain states of the map interface 80. For example, if the computer system 20 cannot determine the correct user profile to apply to the current user, or if a security measure associated with the profile has not been satisfied, the user-specific filter display 860 may be hidden or disabled.

When displayed and active, the user-specific filter display 860 includes filters associated with a user profile. The user can add, modify, or delete these filters, and can assign them to user-defined groups.

Filters that the user can add to the user-specific filter display 860 include: a filter in the general filter display 850; the filter defined by the current state of the map 805; the filter defined by a group of icons 810, which the user can specify by using the pointer symbol; a filter combined from at least two existing filters; and a modified filter which the user chooses to save under a new name.

The modifications that the user can apply to a filter in the user-specific filter display 860 include: renaming the filter; adding, deleting, or reordering elements in its list; and changing the icon class associated with the filter or defining a new icon class for the filter. Properties of the icon class that the user can edit include: its name, its icon face 818, its parent icon class, a textual summary of the document, and any properties displayed in the icon class legend 817.

Electronic Notes

A note document is a document associated with a domain location. It may also be associated with a user profile, or it may exist anonymously. An electronic sticky-note 870 is a representation of a note document displayed on the map 805 in a display location corresponding to a domain location associated with the note document. The note document can contain any form of information that a document in storage 22 can contain. For instance, the note document may contain text, graphics, sound, video, hyperlinks, or a combination thereof. The note document can have its own URL and act as a web page.

The post a note 836 control changes the state of the map interface 80 such that a subsequent click on the map 805 will create a new note document. The note document will be associated with a domain location corresponding to the display location that was clicked, and an electronic sticky-note 870 will appear at said display location and be associated with the domain location represented by that display location.

In one embodiment, having put the map interface 80 in the appropriate state, the user can move document content from outside the client process onto the map 805, thereby initiating a note document creation. The content can be moved by drag-and-drop or copy-and-paste, among other methods appropriate to the computing environment and the media type. For instance, the document content could be a media stream which the computer system 20 begins recording. The content becomes part of the new note document, and the note document is given at least one externally accessible address such as a URL. With the map interface 80 in the appropriate state, the user can create web pages, for example, with one rapid action. In this embodiment, the mechanisms allowing the user to drag-and-drop or copy-and-paste content are provided by the operating system. The terms "drag-and-drop" and "copy-and-paste" are well known in the art.

Several other features of these note documents require description. Users can specify calendar dates and/or times when a document is not to be served to the public, or will expire altogether. When a note document expires, it may be deleted from storage or prevented from appearing in the interface. This allows users to post time-sensitive information at geographic locations. Short lifetime note documents might be used to make an animated icon on the map interface. Such an icon could follow a moving object or a user's approximate path through the domain.

Users can digitally sign note documents to help ensure their authenticity to other users. Public key cryptography, like PGP, is standard in the art and can be used to affect this. The audience of a document can be limited using this same type of public key cryptography or by requiring users to login with a private password that authenticates their identity. The creator of the note document can determine the list of registered users permitted to see a particular note document. Alternatively, the creator could distribute the encryption key needed to open a note document. This allows users to publish note documents to a subscription list.

Users can host their own note documents on private computer systems. Such private computer systems may be licensed copies of part or all of the computer system 20. Such a privately held note document might be protected by security measures. The creator of such a note document can create additional note documents in other instances of the computer system 20, which may be owned by other people or companies. These additional note documents could provide pointers to one or many note documents on the creator's private computer system. These additional note documents might contain a summary of the original note document. Users of one instance of the computer system 20 may have access to certain other instances of the computer system 20. This access is determined by the owner of each instance. This allow many instances of the computer system 20 to participate the hosting and distribution of geographically-located note documents.

Since any media type can be easily put in to a note document, it is easy for the owners of an instance of the computer system 20 to create note documents from data from other computer systems under their control. For example, a store owner can copy their inventory database into note documents in their instance of the computer system 20. This conversion of a store database to geographically-located note documents makes it easy to serve the inventory information to other users interested in the stores physical area.

A user can upload or create a collection of note documents in one action, such as dragging and dropping a folder of documents into the map interface. If the documents contain location information, they can be automatically posted in the map interface. If not, the user can be prompted to select locations for each document.

Such a collection of note documents will be grouped in a filter in the user-specific filter display 860. Examples of such grouped note documents include a collection of photographs taken on a vacation, a collection of sound recordings taken around a city, a set of data gathered from various sensors, a sequence of events for an newspaper article, or a set of descriptions for a trail guide. A collection might have colored lines connecting the various icons on the map 805, thereby indicating a path that could be followed by a user in the domain.

Such a collection could be created for a user by a service or device. For example, a user's camera might include a GPS or other spatial locating device that imprints each picture with a location stamp. Uploading the pictures is then quite simple: the stamps locate each picture on the map 805. A service might do this on a user's behalf. For example, a hospital might annotate a user's medical record with locations of where the user was treated and post them as a private note document collection for the user and other care providers.

The user can post a note document containing dynamic software such as a discussion board, order entry tools, telephone connect service, or other software-backed tool. A note document posted at the location of a vending machine might have an order entry tool connected to the vending machine that allows users to use a credit card or other payment mechanism to purchase items from the machine. This allows users get physical items without paying cash or even carrying a credit card.

A note document posted at a store might contain a discussion board with text and other media entry tools allowing the general public to engage in a discussion at that location. Such message boards might receive text messaging from portable phones and broadcast them to users viewing the discussion board.

A note document might contain a tool, which, when clicked, causes a user's phone to dial into a service. Such a note document might be posted at a restaurant or theater where telephone reservations are required.

Community Feedback

The map interface 80 can use the community feedback 880 control to show the user information gathered from the behavior of other users. Features of the community feedback 880 control include domain usage feedback 882, word-domain suggestion 884, and word-word suggestion 886.

When the user views a spatial domain, domain usage feedback 882 tells the user how many people have viewed that domain or part of that domain in the recent past. For example, "23 people have viewed this region in the last 18 minutes."

When a user views a spatial domain, word-domain suggestion 884 can tell the user keywords that are relevant to this domain. These words can be gathered by analyzing documents that refer to this region to find the words that occur most in that domain. These words may also be gathered by recording the keywords that other users have entered when viewing this region. The most commonly searched for words can be presented to the user.

When a user enters a keyword query, word-word suggestion 886 can tell the user additional keywords that relate to the keyword(s) just entered. These additional keyword suggestions come from a thesaurus that may be built by recording the sequence of queries entered by other users. If many users enter the same keywords together or in a single session, then those keywords can be considered related. For example, if many users search for "chocolate" and then search for "chocolatier" the computer system 20 can suggest to the next user who enters "chocolate" to try a keyword query for "chocolatier." This suggestion helps users find what they want.

Data Collection

The computer system 20 includes a data collection 30 process for gathering new documents. With reference to FIG. 3, the data collection 30 process includes a crawler 36 process, a page queue 34, and a metasearcher 32 process.

Crawler and Page Queue

The crawler 36 loads a document over a network, saves it to the page repository 222, and scans it for hyperlinks. By repeatedly following these hyperlinks, much of a networked system of documents can be discovered and saved to the page repository 222. The crawler 36 gathers documents into the computer system 20 in this manner. In one embodiment, these documents are World Wide Web pages available on the Internet. In this case, downloading pages can be done using any of the various Internet protocols, including the HyperText Transfer Protocol (http), the File Transfer Protocol (ftp), gopher, news, wais, and others.

The page queue 34 stores document addresses. The crawler 36, the pioneer 48, and the metasearcher 32 add document addresses. The page queue 34 comprises a database table, the page queue table 340.

The crawler 36 gets document addresses to crawl from the page queue 34. When the crawler 36 loads a previously unknown document, it passes the document to the pioneer 48 process. The pioneer 48 parses the content of the document for hyperlinks to new documents. The pioneer 48 adds any addresses referenced by such hyperlinks to the page queue 34.

The crawler 36 makes use of the fact that the probability of being spatially relevant is correlated with linkage; in other words, pages linked to a spatially relevant page have a greater probability than average of being spatially relevant. Each crawled URL is assigned a spatial relevance. Considering spatial relevance helps the crawler 36 use time and other resources efficiently.

The crawler first crawls pages linked from those pages with spatial relevance greater than a predetermined threshold. After a page has been downloaded and its spatial relevance calculated, its spatial relevance level 342 field can be recalibrated to reflect the actual relevance we found.

Metasearcher

The metasearcher 32 initializes the collection of known documents. This initializing step is called "seeding" or "bootstrapping." The computer system may have to be seeded for each domain. For example, separate bootstrapping operations may be used for United States postal addresses and French postal addresses.

The metasearcher queries search engines known to store information appropriate to the domain, such as search engine web sites on the Internet. The human administrators of the metasearcher provide it with a collection of known spatial locations appropriate to the domain. The metasearcher formulates queries based on these spatial locations and directs the queries to the search engines. The results are compared to the collection of known documents and are added if new.

A crawling is complete when all discoverable documents on the network have been found. In practice, this rarely happens over large document collections unless the collections are extremely static. Thus, since a complete crawling is rarely likely, the speed of the crawl is an important design concern. The speed of crawling is limited by the speed at which new pages are discovered through links on previously downloaded pages. A good way to accelerate this crawling is to query existing search engines that have already crawled at least part of the document collection, which could be the Web. The results given by these search engines are used to bootstrap the data collection 30 process.

In one embodiment, the metasearcher 32 bootstraps its knowledge of the geography of the United States. The process for this bootstrapping comprises six steps. Other domains may require different processes.

The steps are a system of levels intended to gather the most useful spatial URLs from existing search engines. Since search engines commonly limit the number of results returned to a single query, searches might not return all the results that we would like to gather. For instance, in a geographic query, this happens with town names like "Boston, Mass." In such cases, it is useful to specify other words in the query, such as all the street names in that town.

Major search engines include AltaVista, Fast, Lycos, MetaCrawler, DogPile, NorthernLight. Each engine has a maximum number of results that they will return for a query, even if they have more pages that meet the query. If a metasearch query overflows this number, the metasearcher 32 adds words to the query to squeeze out more URLs.

In step 1, the metasearcher 32 queries the search engines with just the town names, e.g. "boston" "cambridge" "new york" "madison" "san antonio".

In step 2, for any town name that resulted in the maximum number of results for that engine, the metasearcher 32 re-queries the search engine with the town and the state, e.g. "boston, ma" "boston mass" "boston massachusetts" "cambridge, ma" etc . . . "new york, ny" etc . . . "madison nj" . . . "madison ny" . . .

In step 3, the metasearcher 32 switches to a second table, which has more information. The second table includes all the streets in every town in the USA. For any town-state pair that overflows on a particular engine, the metasearcher 32 queries for every street, e.g. "highland Somerville" "hancock somerville" "elm somerville" etc.

In step 4, the metasearcher 32 adds in state names with the street names, e.g. "highland somerville ma" "hancock somerville ma" "elm somerville ma" etc.

In step 5, the metasearcher 32 adds in street types, e.g. "highland ave somerville" "highland avenue somerville" . . . "hancock st somerville" . . . "elm st somerville" etc.

In step 6, the metasearcher 32 adds in street types and state names, e.g. "highland ave somerville ma" "highland avenue somerville ma" "highland avenue somerville massachusetts" etc. Few places reach this level.

The page queue table 340 includes a spatial relevance level 342, which helps constrain the crawler 36 to documents that are spatially relevant. When the metasearcher 32 gathers a document, the document is given a level of "0."

Data Analysis

Figure 4:
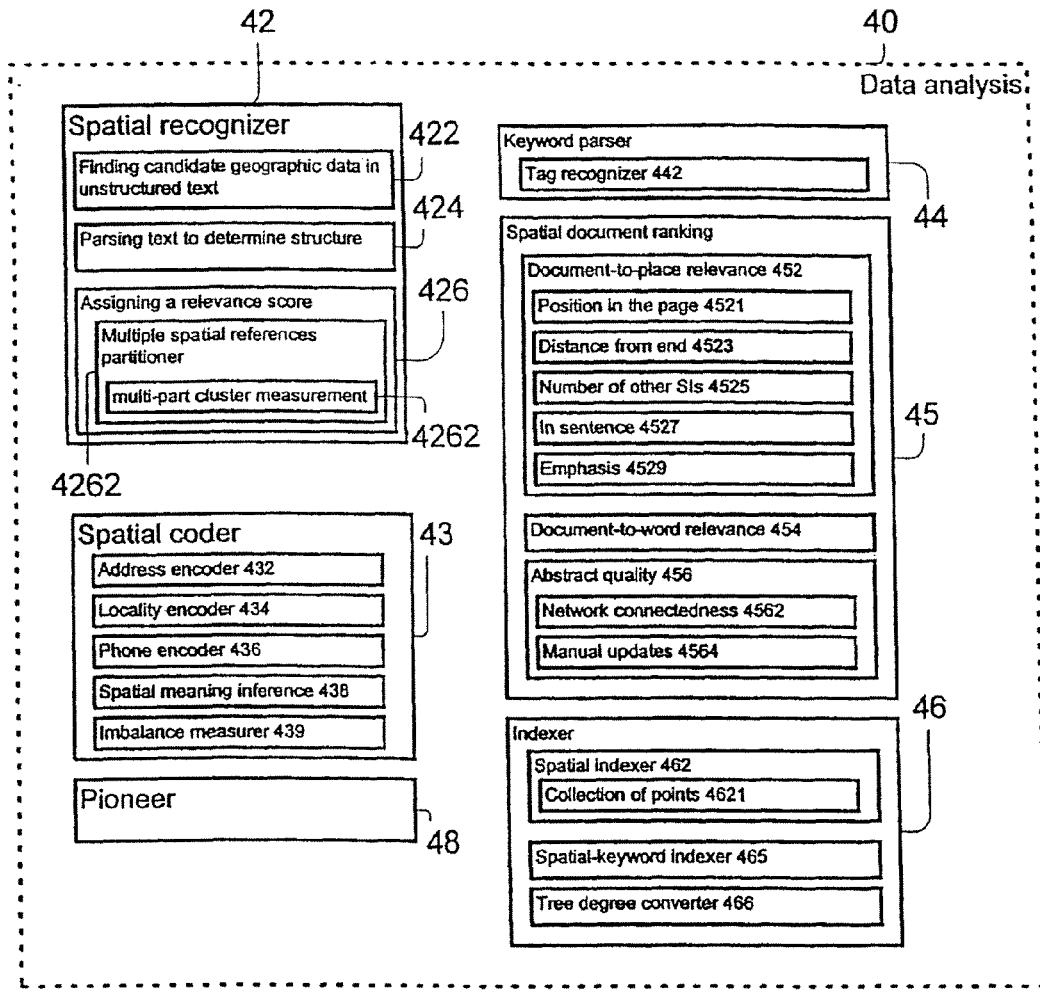
FIG. 4. is an explanatory diagram of entities in a data analysis process.

With reference to FIG. 4, the computer system 20 includes a data analysis 40 process for extracting information and meta-information from documents. Data analysis 40 includes a spatial recognizer 42 process, a spatial coder 43 process, a keyword parser 44 process, an indexer 46 process, a spatial document ranking 45 process, and a pioneer 48 process. The role of the pioneer 48 process is described in the section for data collection 30. In the data analysis section, we will repeatedly cite the example of the standard geographic domain for the USA, identified by the standard latitude/longitude but also by postal system addresses, localities, and phone numbers.

Spatial Recognizer

As new documents are saved in the page repository 222, the spatial recognizer 42 opens each document and scans the content. It searches for patterns that resemble parts of spatial identifiers. For example, in the standard geographic domain for the USA, patterns include street addresses of the USA postal system, localities, and phone numbers.

In step 422, the spatial recognizer 42 finds candidate spatial data in unstructured text. Candidate spatial data, is called a PSI, for possible spatial identifier.

In step 424, the spatial recognizer 42 parses the text of the candidate spatial data to determine its structure, thereby forming a PSI. We break addresses into a standard set of fields used by the US postal system. Similar formats exist for other postal systems, which would be represented as other domains. The constituent parts of the PSI are identified. Not all may be present in a given document; for localities and phone numbers, only town, state, and possibly ZIP and ZIP+4 are used. The constituent parts include:

House number
Street prefix (e.g. East, South)
Street name
Street suffix (e.g. East, South)
Street type (e.g. Street, Turnpike, Square)
Town
State
Zip
4-digit zip extension PSIs are stored in the spatial lexicon 224 for further analysis. The table for these possible spatial identifiers (PSIs), which in this case is mapped against the standard geographic domain, includes fields for latitude and longitude. Regardless of domain, the table may include fields for spatial coding confidence, number of documents located at this place, status of spatial coding, and sum of relevances of documents located at this place.

The relevance scorer 426 assigns a relevance score to the document.

The relevance scorer 426 includes a multiple spatial references partitioner 4262 process. Many documents have multiple spatial references. It might be the case that all the spatial identifiers are relevant to the whole document. An example is a web page listing branch locations of a store chain. However, it can be the case instead that each spatial identifier is only relevant to a proper subset of the page. An example of this is a page giving short reviews of a number of restaurants. Such a page is a multi-part document.

Multi-part documents present a problem when searching the document collection by keyword. Were the document to be keyword indexed as a whole, a word in one part of the document would be indexed as though it were relevant to addresses in a different part of the document, when in fact the word may not be relevant to that part.

To detect multi-part documents, the multiple spatial references partitioner 4262 invokes the multi-part cluster measurement 42625 process. The multi-part cluster measurement 42625 process first rejects any document with fewer than some number of addresses (usually 5) or which is shorter than some number of words (perhaps 200). The multi-part cluster measurement 42625 process computes an array containing the fractional positions of each PSI in the page. For instance, an address that begins at the 200th word in a 1000-word document is at fractional position 0.2. We then apply a clustering statistic such as the Gini coefficient to produce a clustering score that expresses how concentrated the addresses are on the page. Documents with low clustering score (indicating that the addresses are evenly spread out) are likely to be multi-part documents. The threshold for the maximum clustering score is determined empirically and may vary for each domain.

The multiple spatial references partitioner 4262 partitions the document into segments that contain one PSI each, using the PSIs as boundaries, as follows. The nth segment, containing PSI n, begins at the word following the end of PSI n−1, and ends at the word before PSI n+1. For n=1, the segment begins at the first word. For the last PSI on the page, it ends at the end of the page.

Each segment then has the title portion of the document added to it. The tag recognizer 442 provides one way of determining the title portion of a document.

The segment is stored in the page repository 222 to be separately indexed. The unsegmented page is retained, so that when a segment is found as a search result, the full document can be returned, with an anchor placed at the beginning of the segment so that the document can be scrolled to the segment before presenting it to the user.

Spatial Coder

To further analyze the PSIs, the spatial coder 43 process runs several processes that associate domain locations with various identifiers in the document content. In the standard geographic domain, we can associate latitude/longitude points or bounding polygons with identifiers; this process is known as geocoding. If no latitude/longitude can be matched to a PSI, the spatial coder 43 marks it misrecognized. Otherwise, the spatial coder 43 turns the PSI into a known spatial identifier, or KSI. This completes the entry in the spatial lexicon 224 described above.

The spatial coder 43 for the standard geographic domain for the USA includes an address encoder 432, a locality encoder 434, and a phone number encoder 436.

With reference again to the standard geographic domain for the USA, addresses are considered the best match. Thus, if a page has addresses in it, simple place names like "Cambridge, Mass." and phone numbers are not used to spatially code the page. A page can have multiple KSIs, but that reduces its spatial relevance (see spatial document ranking 45), so we look primarily for pages with only a few highly focused KSIs. A focused KSI means that the spatial coder 43 associates a small area in "lat/long space" (space identified by latitude and longitude) with high certainty. Thus, for example, a phone number associates with a region the size of a telephone exchange, which is at least several square miles, but a postal address associates with a "rooftop" sized region usually represented by a point in the middle of the hypothetical rooftop. If a phone number and an address in a document both agree on the location of the page, we can improve the ranking of the document (spatial document ranking 45).

Address encoder 432: Postal addresses in the USA and other countries can be associated with small geographic regions, usually the size of a building. Standard geocoding procedures approximate this by a point. Given a PSI like this, for instance:

77 massachusetts ave|cambridge|ma|02139 the associated lat/long can be discovered by feeding the text string into any standard address geocoding product. Examples include Etak's Eaglecoder, Sagent's GeoStan, and ESRI's ArcINFO geocoding plug-in. The output of Etak's Eaglecoder looks like this:

<command line interface> jrf@raag:~$mc/lib/etak/rie-b
<input text of PSI> 77 massachusetts ave|cambridge|ma|02139
<output of geocoder> 77 MASSACHUSETTS AVE, CAMBRIDGE,Mass.,02139,42.358968, −071.093997

The third line of the output contains lat/long information to associate with this address. Thus, this PSI can be converted into a KSI.

Locality encoder 434: Place names, like "Boston, Mass." and "Washington Monument," are listed by the US Census along with the latitude longitude of the center of the place. This makes it easy to geocode them. The locality encoder 434, similar to the address encoder 432, searches for candidate strings that could be town and state names. The locality encoder 434 differs, however, in that it looks up the town name in a database of all known towns in the United States 2262, and rejects the town name if it does not appear.

Phone number encoder 436: The phone number encoder 436 converts phone numbers to geographic locations by looking up the area code and exchange in a phone-to-place table 2266. The phone-to-place table 2266 maps area code-exchange pairs to town name-state name pairs. This pair is then treated as a locality name, except that its relevance score is lowered by a small constant number (determined heuristically) to reflect the fact that towns obtained in this way are somewhat less valuable than towns that have been mentioned by name. A single telephone company central office may cover multiple towns, especially in suburban locations; there is a chance that the phone number is actually located in a neighboring town.

Spatial Meaning Inference

The spatial coder 43 includes a spatial meaning inference 438 process, or SMI 438, which can perform a special type of spatial coding. The SMI 438 can deduce a spatial relevance for terms (words and phrases) based not on a semantic interpretation but on statistical properties of appropriate portions of the spatial-keyword document index 505.

Certain words and phrases correspond to geographic locations but are not recorded by any existing geocoding services. To discover these geographic relations, the SMI 438 statistically analyzes the correlation of candidate words and phrases with KSIs. The SMI 438 uses the premise that if a phrase occurs mostly in documents with addresses in the same place, then the phrase is probably also about that place. For example, "the big apple" occurs on many pages with the words "New York, N.Y." and addresses in New York City. The SMI 438 can deduce that "the big apple" is also about New York City.

The SMI 438 deduces spatial relevance as follows. The spatial-keyword document index 505 contains a tree for each indexed term, i.e. each term in word lexicon 225. For each word in a given string, the SMI 438 examines the tree associated with that word. The examination includes invoking the imbalance measurer 439 to measure a degree of imbalance in the structure of the tree, which, since it is a trimmed version of the spatial document index 503, may have significant imbalance as a result of trimming. The imbalance measurer

439 is described below. Broadly speaking, and as will be described in more detail, if enough terms in the string have trees which have similar imbalances, the SMI 438 associates the string with the spatial regions described by the imbalanced portions of said trees.

Returning to an earlier example, each word in the phrase "the big apple" appears in many documents. Performing a search over a spatial-keyword document index 505 for that phrase without specifying a bounding box will find a large "peak" in the number of documents near New York City. This is evidenced by the degree of imbalance in the trimmed result tree. The tree resulting from the intersection of these three words has many branches in the latitude-longitude region covering New York City. This tells us that pages with these three words next to each other are probably referring to this lat/long region.

We call such words and phrases "geographic phenomena."

A tree address is defined as follows. Given a spatial-keyword document index 505, any node or leaf in the index trees can be identified by a set of values indicating the sequence of child node numbers that must be traversed to reach that node. For example, in a binary tree, the tree address 0110 specifies the node found by starting at the root node and going to the first child's second childs' second child's first child. In a 16-way tree, the tree address written in hexadecimal as "0x4f8" specifies the node found by starting at the root node and going to the fifth child's sixteenth child's ninth child.

To measure the "peakiness" of a particular phrase without using a spatial-keyword document index 505, the imbalance measurer 439 first computes a "standard peakiness" of average words and then compares candidates to that. In one embodiment, the imbalance measurer 439 computes the standard peakiness by picking a random sampling of words and, for each of those words, computes the 2-dimensional variance of the points referred to by documents that contain the word. Documents that are particularly relevant to a word can be given extra weight in computing the variance, e.g. a highly relevant document can be scaled linearly so that it appears to represent multiple documents at that location. Given this random set of variances, the imbalance measurer 439 computes the average variance. The average variance can be used as a baseline to detect a geographically relevant phrase or word. Any word or phrase with a variance much smaller than the baseline is a geographic phenomenon.

Use of the spatial-keyword document index 505 simplifies the SMI 438 dramatically. Since the trees in the spatial-keyword document index 505 already span all the documents known to the computer system 20, the SMI 438 can detect a geographic phenomenon simply by considering the set of tree addresses of leaves in a trimmed result tree. For example, given a candidate word or phrase, the SMI 438 queries the spatial-keyword document index 505 to get the trimmed result tree for this word or phrase and performs the following operation on this list of addresses.

From the tree, the SMI 438 creates a list of the tree addresses of every leaf. Starting at the first digit in all the addresses, the SMI 438 finds the most common branch number at this level (i.e., for this digit). The branch indexed by this digit is called a "candidate fork" because it is a fork of the tree, pointing in the direction of the candidate location. The SMI 438 computes the fraction of the addresses that follow the candidate fork at that level.

At the next level, the SMI 438 considers all addresses that took the candidate fork in the last level and once again finds the most common fork direction, using it as the next fork direction. The SMI 438 again computes the fraction of addresses still following the candidate fork.

The SMI 438 repeats this until the percentage of addresses still following the candidate fork falls below a predetermined threshold adjustable by the operators of the computer system 20. The particular threshold may be adjusted for each domain. Adjusting the threshold adjusts the quality of matches that are considered. It is set empirically.

For example, for simplicity of explanation consider a binary tree whose nodes divide a domain space into rectangles, and consider these four addresses that fork together for several levels:

1011110101011111
1011101011101010
1011101011101111
1011101011101101
Level 1: forked 1=100%
Level 2: forked 0=100%
Level 3: forked 1=100%
Level 4: forked 1=100%
Level 5: forked 1=100%
Level 6: forked 0=75%
Level 7: forked 1=75%
Level 8: forked 0=75%
Level 9: forked 1=75%
Level 10: forked 1=75%
Level 11: forked 1=75%
Level 12: forked 0=75%
Level 13: forked 1=75%
Level 14: forked 1=50%
Level 15: forked 0=25%—below 50% threshold.

These tree addresses suggest that the word is 100% relevant to a region defined by the rectangle in the spatial index tree 502 by the address 10111, and 75% relevant to the rectangle 10111010111.

If a particular word is rare, i.e. occurs only a few times in the entire page repository 222, but its appearances are highly correlated with geographic identifiers in the same place, then that word might be associable to a point location. For example, the word "EVOO" is the name of a restaurant in Somerville, Mass., USA. The word "EVOO" appears only a few times in the entire corpus. Most of these times it appears on a page with the address for the restaurant. The other times, it appears on pages reviewing the restaurant. Given the strong correlation of "EVOO" with the restaurant's address, we can geocode the word "EVOO" with the same latitude/longitude point. This enables us to geocode the other pages with that same point. The latitude/longitude point is transmitted from one page to the other pages through the word link "EVOO."

Note that the spatial meaning inference 438 process is not usually able to associate a phrase with a location as focused as a point. Bounding polygons are a more common result. The main purpose of geocoding these phrases is to improve the ranking of documents, discussed in the section on spatial document ranking 45.

Keyword Parser

Non-geographic search terms (keywords) are identified as follows. As the documents are saved to the page repository 222, a keyword parser 44 process opens each document and scans its keywords. These keywords are stored in a database table called word_instances 227, which includes the fields: wordID 2272, docID 2274, and word-doc relevance float 2276. The word_instances 227 table associates a given keyword with a set of documents containing it.

The WordID is a number that replaces the string of characters in the word. This reduces storage requirements and allows us to treat a phrase like "the big apple" as a single database entry. The word lexicon 225 is a database table that acts as the dictionary of all words and their corresponding WordIDs. The word lexicon 225 table includes the fields: word 22621; wordid 22623; and word_occurrences 22625.

The keyword parser 44 includes a tag recognizer 442 for parsing documents that contain tagged text such as SGML or the related standards HTML and XML. Tag recognizers for various document standards are well known in the computing art and can even be a feature of the operating system.

Methods standard in the art may be used to index a document for phrase searching, this allows a user to issue a query for a set of words close together or immediately adjacent in documents.

Spatial Document Ranking

Given the potentially vast amount of information, document ranking is very important. Results relevant to the user's query must not be overwhelmed by irrelevant results, or the system will be useless.

The spatial document ranking 45 process produces a ranking of documents that includes evaluations of document-to-place relevance 452, document-to-word relevance 454, and abstract quality 456. Evaluations are combined into a floating point number indicating the relevance of each document to the query.

The document-to-place relevance 452 score indicates a document's relevance to a domain location, where the domain location is described by a PSI or KSI within the document. The following is a method of considering the relevance of one SI (spatial identifier, which might be a PSI or a KSI) to one document. It is possible to compute this for several different SIs in the same document. These SIs can be combined if they all refer to the same geographic region. For example, a document might have an address and a phone number that we can geocode. If the address is to a point nested inside the phone number's area, then we can improve the geographic relevance of the document to that address. The boost in relevance might be affected by handcrafted weights chosen for the different circumstances in which multiple SIs can combine on a page. This improvement is secondary to the relevance computed by the following method.

Document-to-Place Relevance

The document-to-place relevance 452 score includes the following scores: position in page 4521, distance from end 4523, number of other SIs 4525, in sentence 4527, and emphasis 4529. (See Appendix A)

The position in page 4521 score is a heuristic function, calibrated from large numbers of observations of SIs. It assigns a score on the premise that SIs appearing earlier in a document are likely to be more relevant. Distance may be measured in characters or bytes. SIs that appear "above the fold" (on screen when a page is first loaded, without having to scroll) are considered most relevant.

The distance from end 4523 score gives the document-to-place relevance 452 score a slight boost if the SI occurs at the footer of the document; this partially counteracts the low score assigned to it by the position heuristic.

The number of other SIs 4525 score is a heuristic function that dilutes the relevance of a SI based on how many other SIs are in the same document. Documents with large numbers of addresses tend to be lists, where any individual address has a low probability of being relevant to the document.

The in sentence 4527 score gives a slight boost to SIs that are free-standing, as opposed to being mentioned in a sentence.

The emphasis 4529 score reflects the degree of emphasis of the SI text, including being in boldface, large type, or in the page's title. This score takes the form of a decimal number where 1.0 is assumed to be standard (neither de-emphasized or emphasized); lower numbers indicate lack of emphasis (such as small text) and higher numbers indicate prominence.

Document-to-Word Relevance

The document-to-word relevance 454 score indicates the relevance of a particular word to a particular document that contains it. Means for measuring the relevance of a word to a document are well known in the art. For instance, see S. E. Robertson and K. Sparck Jones, "Simple, proven approaches to text retrieval," University of Cambridge Computer Laboratory technical report, May 1997.

Phrase searching may also affect document relevance. This type of relevance is typically computed on-the-fly at the time of a user's query for a particular phrase. There are methods standard in the art for computing this type of relevance.

Abstract Quality

The abstract quality 456 score represents document value independent of a given word or place. There are several ways to measure this, including the number of pages that link to the document, the number of times people click on the document when it is served as a search result, and the number of other documents that refer to the same words and places—that is, if it is a document like many others, its abstract value might be considered low, independent of the particular words it contains.

The abstract quality 456 score include components for network connectedness 4562 and a manual updates 4564. Network connectedness 4562 is computed from the probability that the page will be chosen by a random crawl of the web. This probability is then mapped to a score. The particular mapping chosen depends on the size of the document collection in the page repository 222, since the probability of finding any given document is inversely proportional to the collection size.

The manual updates 4564 score is designed to incorporate the input of human editors. The editors can craft rules that adjust the abstract quality 456 of particular documents. For example, they can weight all documents within a particular site as better than other documents simply by increasing their document quality measures. They might do this with a site that itself is a careful product of human editors, such as Zagat.com.

The abstract quality 456 score is stored in an abstract_document_quality 228 table, which includes the fields doc_id 2281 and document_quality 2283. The doc_id 2281 field is a foreign key referencing the doc_id 2221 field in the page repository 222.

Indexer

The indexer 46 analyzes documents to prepare data structures that accelerate the search 50 process. The indexer 46 includes a spatial indexer 462, spatial-keyword indexer 465, and a tree degree converter 466.

Spatial Indexer

Figure 7:
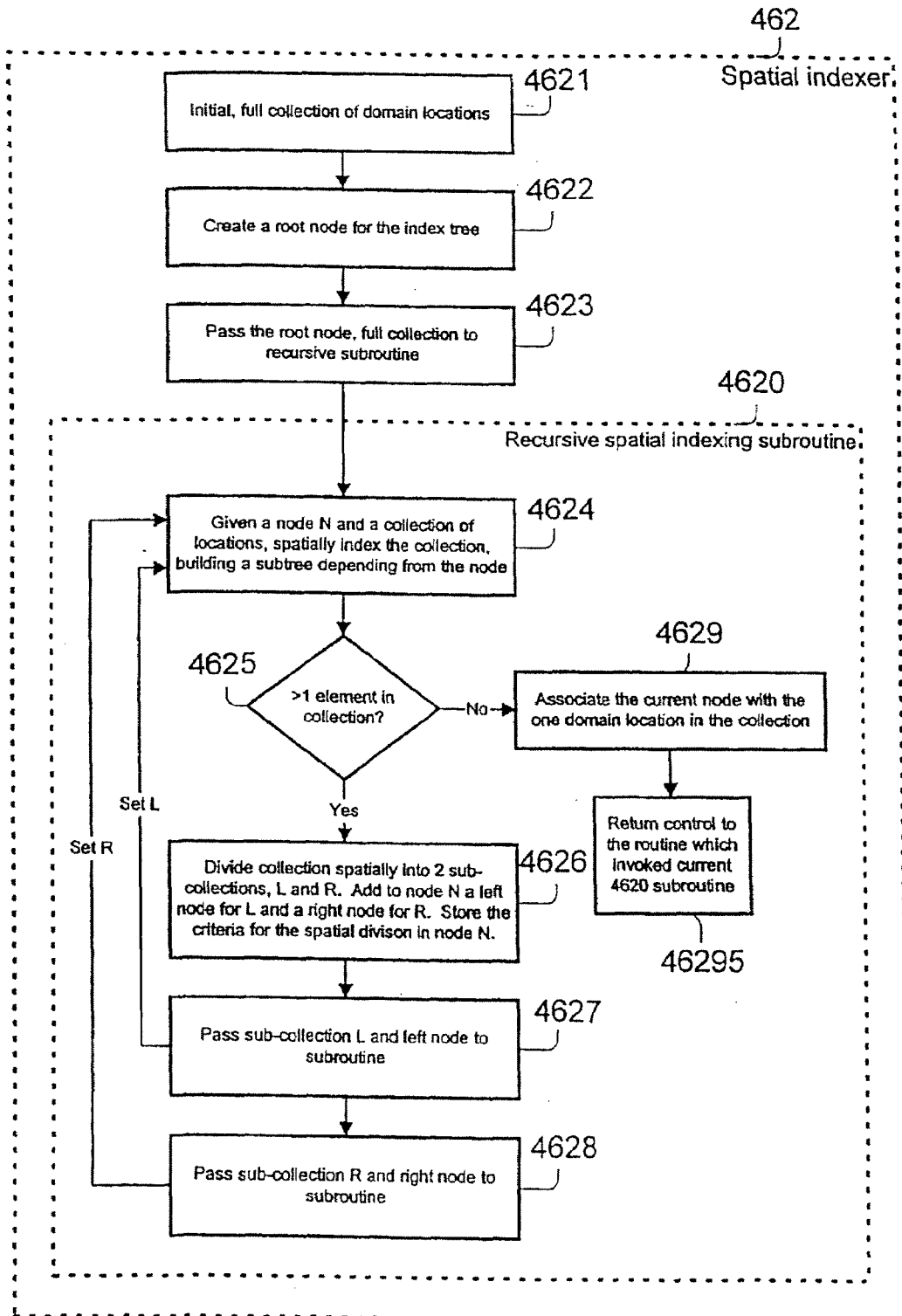
FIG. 7. is an explanatory diagram of steps in a spatial indexer process.

With reference to FIG. 7, the spatial indexer 462 creates a spatial index 502 and a spatial document index 503 for a domain space. The spatial index 502 is a binary tree. The spatial document index 503 is a tree that is based on the spatial index 502, but may be of a higher degree than 2 (the degree of all binary trees).

The spatial indexer 462 in step 4621 gathers a collection of all domain locations referenced by a document in the page repository 222, then creates a root node for the spatial index 502 tree in step 4622. The spatial indexer 462 passes the root node and the collection to step 4624, which marks the beginning of the recursive spatial indexing subroutine (or RSIS) 4620.

In step 4624, the RSIS 4620 receives a node and a collection. The RSIS 4620 examines the collection in step 4625 to determine whether the collection contains more than one element. If it does not, the RSIS 4620 associates the current node with the one element's domain location in step 46295 and goes to step 4629, returning control to the routine that invoked it. Otherwise, the RSIS 4620 proceeds to step 4626, where the RSIS 4620 spatially divides the collection along spatial divider D into collections L and R, such that L and R are as equal in number as possible. If the domain space is a plane, the spatial divider D is a line in the plane. If the domain space is in three dimensions, the spatial divider D is a plane through 3-space. In general, if the domain space is of X dimensions, the spatial division is a manifold of dimension X minus one. The RSIS 4620 in step 4626 also stores the criteria for the spatial divider D in node N. Thus, each node contains criteria that divide a master collection of locations into two sub-collections.

The RSIS 4620 in step 4626 also creates a left node and a right node on the node passed to step 4624. This creates a fork in the binary tree that will act as an index. The tree as a whole becomes the spatial index 502.

The RSIS 4620 becomes recursive by invoking itself on each of the sub-collections. Specifically, in step 4627 the RSIS 4620 passes sub-collection L and the current left node to step 4624, while in step 4628 the RSIS 4620 passes sub-collection R and the current right node to step 4624. The RSIS 4620 repeats until every collection has been divided into collections of single elements, which are associated with childless nodes. All other nodes have division criteria and two nodes descending from them.

After the spatial indexer 462 builds the spatial index 502 tree, which indexes the points referred to in a corpus of documents, the spatial indexer 462 builds the spatial document index 503 by extending a copy of the spatial index 502 tree to cover multiple documents that refer to the same spatial point. The spatial indexer 462 invokes a tree degree converter 466 to make a version of the spatial index 502 that is represented in a tree of degree k.

The extension of the spatial index 502 produces new branches that no longer reflect spatial divisions but instead reflect partitions of the documents referring to that point. In particular, instead of the nodes including criteria that define spatial divisions within the domain (as the nodes inherited from the spatial index 502 continue to do), the nodes added after the extension include criteria for branching within the space of the docID 2221 numbers of the documents. Partitioning based on a key value (such as the docID 2221) of a database table is standard in the art. Such a partitioning produces a k-way tree on the documents using their docID 2221 numbers as a key.

Degree K

An important optimization of an index tree of degree k involves the selection of k. A k-way branching structure must be chosen before building or storing the trees. K could be as low as two and as high as a few thousand or tens of thousands, depending on the number of documents and possibly the underlying computing platform. A tree of degree k can index $(k)^L$ documents in L levels.

A large value for k makes it faster and more storage efficient to deal with keywords that appear in only a few documents. If the number of rare words in the page repository 222 is large, a large value for k is more storage efficient than a smaller one. However, a smaller value of k can be more search efficient, as it allows a traversing process (in response to a query) to ignore branches of the tree that fail its constraints.

The selection of k is an empirical process that may be performed for every set of documents, in the page repository 222, to be indexed. It is influenced by hardware limits, such as the number of bits handled by a single processor instruction and the number of blocks loaded by the disk drive. The most important factor in choosing k is the word-frequency distribution. Keyword lexicons for web pages, for instance, show a huge number of words that appear in only one or two documents, but more common words appear in many documents. These common words produce a "fat tailed" distribution. The exact shape of the distribution for a particular set of documents determines the optimal k. Given a value for k, it is a simple calculation to count the number of bytes used to store the word trees for a particular lexicon and set of documents.

Tree Degree Converter

The tree degree converter 466 is a function that accepts parameters including a binary tree and an integer k, and returns as its output a tree of degree k incorporating the structure and data of the binary tree. Methods for this conversion are known in the computing art.

Spatial-Keyword Indexer

The spatial-keyword indexer 465 builds a spatial-keyword document index 505 responsive to queries for documents. The queries can have keyword criteria, spatial criteria, or both.

The spatial-keyword indexer 465 gathers all domain locations referenced by documents in the page repository 222.

The spatial-keyword indexer 465 uses the spatial document index 503 generated by the spatial indexer 462. The spatial document index 503 is a k-way tree on this list of documents. The spatial-keyword indexer 465 copies the spatial document index 503 to create a keyword tree 506 for every keyword. For each keyword tree 506, the spatial-keyword indexer 465 trims away all documents that do not contain that particular keyword. If, after the document trimming, the subtree depending from a node of the keyword tree 506 does not contain a document, the spatial-keyword indexer 465 removes that node (and therefore its subtree).

The spatial-keyword indexer 465 creates for each keyword a minimal keyword tree 506 that relates the keyword to the corpus of documents in the page repository 222. Furthermore, the spatial-keyword indexer 465 ensures that one branching structure is common to all keyword trees as well as to the spatial document index 503 tree.

Search

Figure 5:
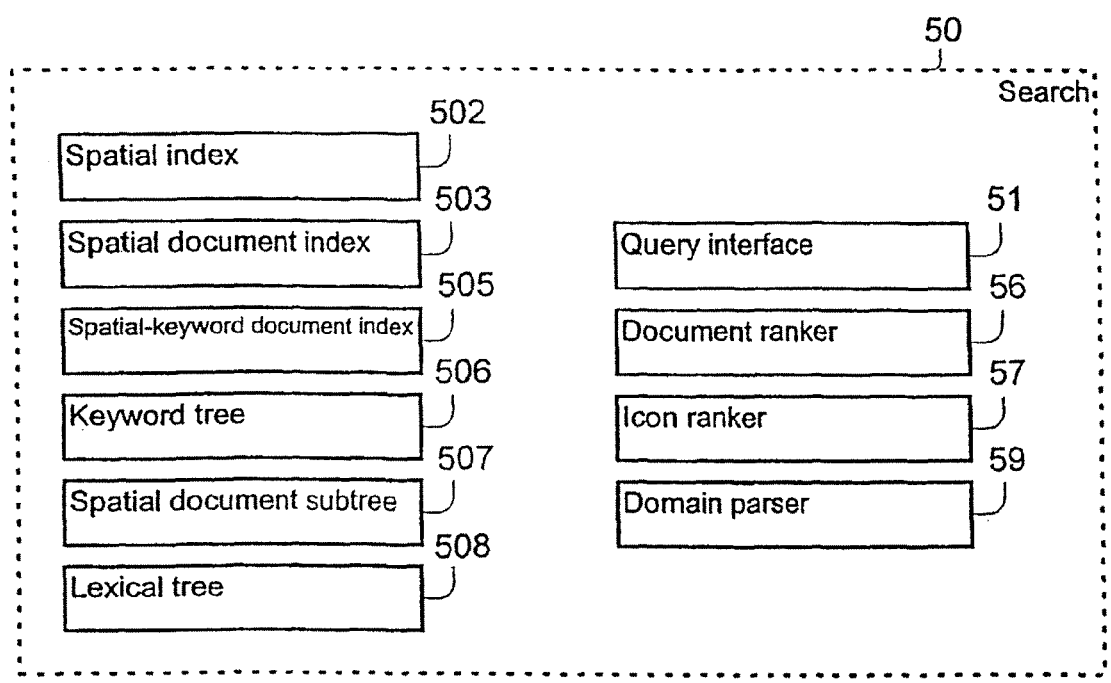
FIG. 5. is an explanatory diagram of entities in a search process.

With reference to FIG. 5, the search 50 process responds to queries with a set of documents ranked by relevance.

A lexical tree 508 is any copy of the spatial document index 503 tree, possibly trimmed. Thus, every keyword tree 506 is a lexical tree 508, as is the spatial document index 503 tree itself. Also, any filter can be expressed as a lexical tree 508, since a filter determines a set of documents, and any set of documents determines a trimming of the spatial document index 503 tree. Thus, lexical trees 508 can be built to index arbitrarily complex sets of documents.

The search 50 process uses the spatial document index 503 and spatial-keyword document index 505 to find documents that refer to a given set of domain locations or regions, and documents related to a given set of keywords existing in the word lexicon 225. The search 50 process can also find documents using a lexical tree 508, such as might represent a filter. Thus, the search 50 process can respond to queries that seek documents according to spatial domain criteria, keyword criteria, filters, or any combination thereof. Furthermore, the search 50 process can invoke the document ranker 56 process to rank the result set of documents by relevance to the query terms.

Figure 6:
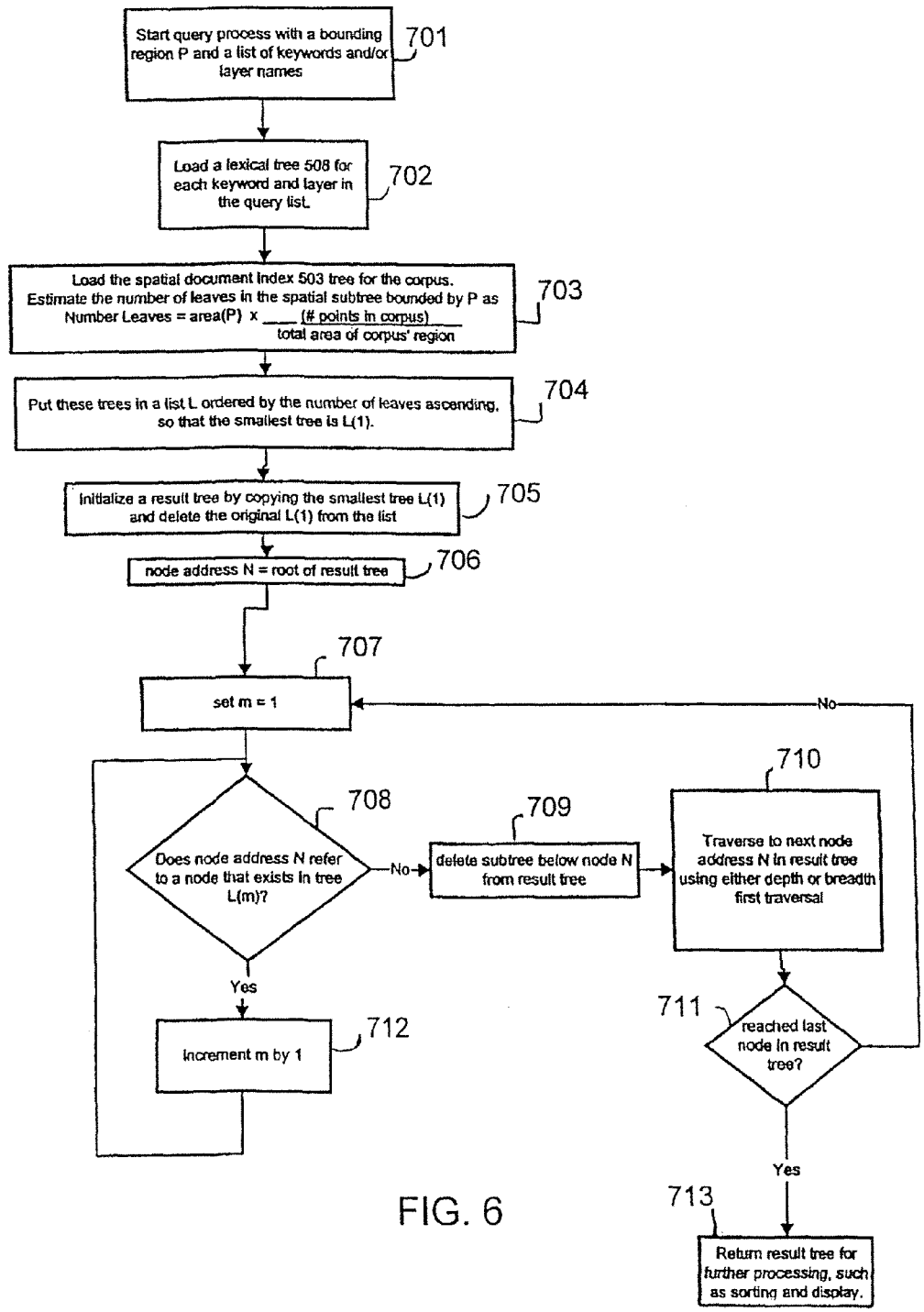
FIG. 6. is an explanatory diagram of steps in a process for building a spatial-keyword indexer.

The search 50 process answers queries via the procedure in FIG. 6. A query includes at least one of the following: a bounding region specifying a closed shape (typically a polygon in two dimensions), words, phrases, and layers. The bounding region can be the domain frame from the map interface 80.

For each element in the query, the search 50 process loads a copy of the appropriate tree, determined as follows. If a bounding region is specified, step 703 loads the spatial document index 503. If keywords are specified, step 702 load the spatial-keyword document index 505 tree for each keyword. If a phrase is specified and the phrase is not a single entry in the word lexicon 225, then step 702 loads each word's spatial-keyword document index 505. If a phrase is specified and is a single entry in the word lexicon 225, then step 702 need only load that phrase's spatial-keyword document index 505. If a layer is specified, its name identifies the appropriate lexical tree 508, which is loaded by step 702.

The search 50 process counts the number of leafs of each of these trees. At step 703, the search 50 process estimates the approximate number of leafs in the spatial document index 503 bounded by the query bounding region, by multiplying the area of the bounding region by the average density of points in the corpus. At step 704, these numbers are used to order the trees in a list, with the smallest tree first.

At step 705, this smallest tree is re-labeled as the result tree and will be trimmed to generate the final result tree. For each node that exists in the partially trimmed result tree, the search 50 process checks all the trees to see if they also contain that node. In steps 708 and 712, the search 50 process checks the trees in list order. If any tree lacks that node, the search 50 process stops checking and in step 709 deletes the subtree below that node in the result tree. (See Appendix B) Steps 710 and 711 traverse the tree. The search 50 process continues checking all the nodes in the result tree until only leaf nodes remain. These leaf nodes represent the result set of documents. Step 713 returns the result tree.

The leafs of spatial-keyword document index 503 trees have word relevances and lists of the positions and contextual emphasis of the words in each document. The spatial document index 503 has spatial relevances for each document. The lexical tree 508 for each layer may have an abstract document quality 456 for some documents. These relevances are combined for each document in the result set. The combination procedure might be averaging, summing, or a weighted average.

A second process might compute adjustments to the document relevances by considering the emphasis and proximity of multiple query words within the documents. This standard procedure simply gives higher relevance to documents in which the query words appear closer together.

The final result list of documents might be sorted for return to the user. The sorting procedure might extract only a portion of the documents with the highest relevance.

Document Ranker

Document ranker 56 combines various relevance scores for each document in a result set and sorts the documents by this combined relevance. The combination function may be an averaging or a weighted sum or some other combining function tailored to the various relevance scores used. The document ranker 56 may take streams of sorted result sets from several database systems and merge sort them to produce a new result set.

Icon Ranker

The icon ranker 57 receives a sorted list of results from the document ranker 56. To present this list to the user who requested the documents, the icon ranker 57 aggregates overlapping icons according to the manner described in the section on Icons. This list of aggregated icons is presented to the user with sublists next to each icon 810. These sublists identify the documents aggregated into that icon 810.

The icon ranker 57 groups documents into icons 810 as follows. The icon ranker 57 takes the first document from the sorted result list and makes it the first icon 810 in the icon list. For each subsequent document having a tentative display location in the result list, the icon ranker 57 examines whether an icon 810 situated at the tentative display location would collide with any icon 810 already in the icon list. If a collision occurs, the icon ranker 57 associates the colliding document with the existing icon. If no collision occurs, the icon ranker 57 adds an icon 810 to the icon list and associates the current document with said icon 810. This procedure may terminate whenever the number of icons reaches the lesser of a maximum number determined by the user or a predetermined number that is a customizable operating parameter of the computer system 20.

If a document is topically affiliated with a particular icon class, the icon ranker 57 assigns an icon face 818 from said icon class to the icon 810 that will represent the document. If multiple icon classes are affiliated with documents represented by a single icon 810, the icon ranker 57 may select one of the said icon classes to assign to said icon 810 or may assign a new icon class built to reflect said multiple icon classes.

User Profiles

The user profiles 65 process manages information specific to user accounts. The information may include descriptions of how users have interacted with the computer system 20 in the past. Other elements that might be recorded include default location to display to the user when beginning an interaction, set of previously collected layers, set of previously posted note documents, previous searches, and previous click patterns or behavior. Part or all of this information may be made directly viewable and editable by the user.

The user profiles 65 process also allows a user to log into the computer system 20 with a user name and possibly a password. The user name identifies the user with a user account, as is common in the art. The map interface 80 can include account login entry controls 861, including a prompt for account login 862, a data entry control 863, and a submission control 864.

Data Presentation

The data presentation 60 process manages the state of the map interface 80 for each user session. As the user changes the state of the map interface 80—for instance, by issuing queries, selecting controls, and generally utilizing the interface tools—the data presentation 60 system keeps track of these changes and their sequence. This recorded history enables querying within previous result sets. For example, a user can query for documents referring to "shoes" in "cambridge, ma," and in a subsequent interaction, the user can filter this set of documents further by requesting only those documents that contain the word "store." This results in a list of documents containing "shoes" and "store" and referring to "cambridge, ma." The user could then zoom out to see a larger region with these document still displayed in the map. To see new documents that might fit the keyword query in this larger domain, the user can re-issue the query.

Similarly, the user could combine a set of documents with another set of documents selected by a different query.

Any number of subsequent filter operations or result set combinations can be performed, limited only by the storage resources of the computer system 20 or, optionally, by parameters built into the computer system 20, as for performance reasons. The data presentation 60 system keeps track of filter operations by a given user so that the computer system 20 can present the correct set of documents to the user at each subsequent interaction.

Service Collector

The service collector 24 includes a proxy through which the user interface server 62 and the portal server 70 communicate with the processes for data presentation 60, search 50, and user profiles 65.

Portal Server

The computer system 20 includes a portal server 70 process. The portal server 70 offers at least some of the services of the computer system 20 through remote procedure calls and other network protocols. This allows the services, data, and tools of the computer system 20 to be delivered through public portal systems or directly to individuals. Examples of companies offering public portal systems include Yahoo! Inc. of 3420 Central Expressway, Santa Clara, Calif., and Sprint PCS of PO Box 8077, London, Ky.

Alternate Embodiments

A number of embodiments of the invention have been described. Nevertheless, it will be understood that various modifications may be made without departing from the spirit and scope of the invention. Accordingly, other embodiments are within the scope of the following claims.

APPENDIX A pseudocode excerpt for assigning relevance of document to place
Heuristically-determined parameters:
$emphasis_bonus_modifier determines the importance of the emphasis bit.
$sentence_penalty_modifier determines the importance of the in_sentence
bit
$sp_full_point: the position after which the sentence penalty fully
applies
$sp_transition_point: the position after which the sentence penalty
starts to apply; it goes from 0 at this position to
$sentence_penalty_modifier at $sp_full_point
$end_bonus_size: maximum number of characters from the end of the
document at which the end-of-document bonus applies
$end_bonus_max: the maximum relevance value for which the end-of-
document bonus applies
$end_bonus_multiplier determines the weight of the end-of-document bonus
Start with the position heuristic function. This is a nonincreasing
function which is normalized to 1 for position 0. It decreases slowly up
to some position p_f which is the average position of the "fold", that
# is, the place where the end of the visible area of a typical document
occurs when it is first displayed to a user. For positions
greater than p_f it decreases more quickly, but levels off for large
positions. The exact form is determined heuristically by manually
assigning a score to a large number of instances of PSIs in typical
documents and fitting a function to these scores.

```
$relevance=&position_function($pos);
```

Bonus for being bold, large font, in title, etc. $emphasis is a
heuristic function of the PSI which was assigned on how emphasized it
is.

```
$emphasis_bonus=$emphasis_bonus_modifier*$emphasis;
```

Penalty for being in a sentence, e.g. "We would like to announce the
availability of several of our products through the Hopkinton Drug
Store, 52 Main Street, Hopkinton, Mass. 01748."
No penalty is assigned for PSIs in the first $sp_transition_point
characters, going up to the full penalty after $sp_full_point
characters.

```
if ($pos > $sp_full_point) {
   $sentence_penalty = $sentence_penalty_modifier * in_sentence;
} else {
   if ($pos > $sentence_penalty_transition_point) {
      $sentence_penalty = $in_sentence * $sentence_penalty_modifier *
          (($pos-$sp_transition_point)/
          $sp_full_point-$sp_transition_point);
   } else {
      $sentence_penalty = 0.0;
   }
}
```

```
$relevance+=$emphasis_bonus-$sentence_penalty;
```

Bonus for being at end of document for long documents. It is
proportional to
how low the relevance already is, so that already highly
scoring PSIs don't receive a bonus for being at the end.
This is before the number of PSIs function so that it will be
depressed by that function (and the last PSI in a big list won't
score too high.)

```
if ($size – $pos < $end_bonus_size && $relevance <
     $end_bonus_max) {
     $relevance += ($end_bonus_max – $relevance) *
        $end_bonus_multiplier;
}
```

Now depress the above score based on how many other PSIs
appear on the page.
num_psi_function($num) is a function which determines how much less
valuable a PSI is when it occurs together with other PSIs.
It is nonincreasing, and is one for $num=1; it decreases
quickly for small $num, and more slowly for large $num.
This function is determined heuristically as described above for the
position function.

```
$relevance*=&num_psi_function($num);
```

APPENDIX B to test the existence of a node address N in a tree T:

```
if (T is a keyword/layer tree) {
   nodeQ = pointer to root node of T;
```

APPENDIX B-continued to test the existence of a node address N in a tree T:

```
    foreach $step in node address N {
        next nodeQ = pointer to child number $step from previous nodeQ;
        if ( nodeQ is a valid child ) {
            continue foreach loop;
        } else {
            exit with return value = "false";
        }
    }
    return "true"; # the loop exited without hitting a nonexistent child
}
if (T is the spatial tree) {
    in the following, polygonP is the bounding region given by the user;
    nodeQ = pointer to root node of T;
    foreach $step in node address N {
        next nodeQ = pointer to child number $step from previous nodeQ;
        if ( region below nodeQ overlaps polygonP) {
        } else {
            exit with return value = "false";
        }
    }
    return "true"; # the loop exited without hitting a division outside
                   # the query's bounding region
}
```

What is claimed is:

1. A method comprising:
retrieving a set of files from one or more computers;
determining to analyze the set of files to identify a plurality of files among the set of files that contain spatial information;
assigning a spatial relevance score to each of the plurality of files;
wherein the spatial relevance score for each of the plurality of files comprises a measure of a degree to which a respective one of the plurality of files relates to a spatial location identified in the spatial information of the respective one of the plurality of files;
causing, at least in part, storage of information about the plurality of files, said stored information indicating that the identified files contain spatial information and including the spatial relevance score for each of the plurality of files; and
causing, at least in part, display of an indication that the identified files contain spatial information.

2. The method of claim 1, wherein the display of the indication comprises for each identified file a visual representation of spatial information that was found in that identified file.

3. The method of claim 1, wherein retrieving the set of files from one or more computers involves retrieving the set of files from computers arrayed across a computer network.

4. The method of claim 1, wherein the files of the set of files are text-based computer files.

5. The method of claim 1, wherein the files of the set of files are non-text files.

6. The method of claim 1, further comprising causing, at least in part, display of a multi-dimensional representation of a domain on which the visual representations are displayed at coordinates that correspond to at least some of the spatial information that was found in the identified files.

7. The method of claim 1, wherein determining to analyze the set of files to identify the plurality of files involves opening each file among the set of files and scanning that file for spatial identifiers.

8. The method of claim 1, wherein the storage of the information about the plurality of files involves spatially indexing the plurality of documents.

9. A non-transitory computer-readable storage medium carrying one or more sequences of one or more instructions which, when executed by one or more processors, cause an apparatus to at least perform the following steps: retrieving a set of files from one or more computers;
determining to analyze the set of files to identify a plurality of files among the set of files that contain spatial information;
assigning a spatial relevance score to each of the plurality of files;
wherein the spatial relevance score for each of the plurality of files comprises a measure of a degree to which a respective one of the plurality of files relates to a spatial location identified in the spatial information of the respective one of the plurality of files;
causing, at least in part, storage of information about the plurality of files, said stored information indicating that the identified files contain spatial information and including the spatial relevance score for each of the plurality of files; and
causing, at least in part, display of an indication that the identified files contain spatial information.

10. The non-transitory computer-readable storage medium carrying one or more sequences of one or more instructions of claim 9, wherein the display of the indication comprises for each identified file a visual representation of spatial information that was found in that identified file.

11. The non-transitory computer-readable storage medium carrying one or more sequences of one or more instructions of claim 9, wherein causing the apparatus to retrieve the set of files from one or more computers comprises causing the apparatus to retrieve the set of files from computers arrayed across a computer network.

12. The non-transitory computer-readable storage medium carrying one or more sequences of one or more instructions of claim 9, wherein the files of the set of files are text-based computer files.

13. The non-transitory computer-readable storage medium carrying one or more sequences of one or more instructions of claim 9, wherein the files of the set of files are non-text files.

14. The non-transitory computer-readable storage medium carrying one or more sequences of one or more instructions of claim 9, wherein the apparatus is further caused to, at least in part, provide for display of a multi-dimensional representation of a domain on which the visual representations are displayed at coordinates that correspond to at least some of the spatial information that was found in the identified files.

15. The non-transitory computer-readable storage medium carrying one or more sequences of one or more instructions of claim 9, wherein causing the apparatus to determine to analyze the set of files to identify the plurality of files comprises causing the apparatus to open each file among the set of files and scanning that file for spatial identifiers.

16. The non-transitory computer-readable storage medium carrying one or more sequences of one or more instructions of claim 9, wherein causing the apparatus to cause storage of the information about the plurality of files comprises causing the apparatus to spatially index the plurality of documents.

17. The non-transitory computer-readable storage medium carrying one or more sequences of one or more instructions of claim 9, wherein the spatial relevance score for each of the plurality of files comprises a measure of a degree to which a respective one of the plurality of files relates to a spatial location identified in the spatial information of the respective one of the plurality of files.

* * * * *